US012431086B2

(12) United States Patent
Yuan

(10) Patent No.: US 12,431,086 B2
(45) Date of Patent: Sep. 30, 2025

(54) PIXEL DRIVING CIRCUIT AND METHOD OF DRIVING PIXEL DRIVING CIRCUIT, DISPLAY PANEL AND DISPLAY DEVICE

(71) Applicants: Chengdu BOE Optoelectronics Technology Co., Ltd., Sichuan (CN); BOE TECHNOLOGY GROUP CO., LTD., Beijing (CN)

(72) Inventor: Changlong Yuan, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/702,975

(22) PCT Filed: Apr. 18, 2023

(86) PCT No.: PCT/CN2023/088966

§ 371 (c)(1),
(2) Date: Apr. 19, 2024

(87) PCT Pub. No.: WO2023/207673

PCT Pub. Date: Nov. 2, 2023

(65) Prior Publication Data

US 2024/0412691 A1 Dec. 12, 2024

(30) Foreign Application Priority Data

Apr. 29, 2022 (CN) ......................... 202210477952.7

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
CPC ... G09G 3/32–3291; G09G 2300/0426; G09G 2300/0819; G09G 2300/0852;
(Continued)

(56) References Cited

U.S. PATENT DOCUMENTS

| | | | | |
|---|---|---|---|---|
| 2015/0145902 | A1 | 5/2015 | Nakayama et al. | |
| 2016/0210906 | A1 | 7/2016 | In et al. | |
| 2019/0251902 | A1* | 8/2019 | Qian | G09G 3/3291 |
| 2022/0020328 | A1* | 1/2022 | Lim | G09G 3/3258 |
| 2023/0048014 | A1 | 2/2023 | Wang et al. | |
| 2024/0021154 | A1* | 1/2024 | Zeng | G09G 3/3233 |

FOREIGN PATENT DOCUMENTS

| | | |
|---|---|---|
| CN | 109903724 A | 6/2019 |
| CN | 110085170 A | 8/2019 |

(Continued)

*Primary Examiner* — Amr A Awad
*Assistant Examiner* — Aaron Midkiff
(74) *Attorney, Agent, or Firm* — WHDA, LLP

(57) ABSTRACT

Provided are a pixel driving circuit (110) and a driving method, a display panel (610) and a display device (900). The pixel driving circuit (110) includes: a driving sub-circuit (111) connected to a light-emitting element (120); a data writing sub-circuit (112) configured to write a data signal from the data signal terminal (Vdata) into the driving sub-circuit (111) and apply the data signal to a leakage current compensation point (M), under control of the scanning signal terminal (Vscan); and a light-emitting control sub-circuit (113) configured to control the driving sub-circuit (111) to output a driving current related to the data signal to the light-emitting element (120) under control of the light-emitting control signal terminal (EM). In a process of emitting light by the light-emitting element (120), a voltage of a control electrode of the driving sub-circuit (113) is compensated by a voltage of the leakage current compensation point (M).

14 Claims, 23 Drawing Sheets

(52) U.S. Cl.
CPC ............... *G09G 2300/0852* (2013.01); *G09G 2300/0861* (2013.01); *G09G 2310/08* (2013.01); *G09G 2320/0247* (2013.01)

(58) Field of Classification Search
CPC ....... G09G 2300/0861; G09G 2310/08; G09G 2320/0247; G09G 3/3233; G09G 3/3241; G09G 3/325; G09G 3/3258; G09G 3/3283; G09G 2300/08–0895; G09G 2340/0435; G09G 3/3266; G09G 2300/0809–0871
See application file for complete search history.

(56) References Cited

FOREIGN PATENT DOCUMENTS

| | | | | | |
|---|---|---|---|---|---|
| CN | 111445848 | A | | 7/2020 | |
| CN | 111710303 | A | | 9/2020 | |
| CN | 111883044 | A | | 11/2020 | |
| CN | 113257192 | A | | 8/2021 | |
| CN | 113284454 | A | | 8/2021 | |
| CN | 113362758 | A | * | 9/2021 | ............... G09G 3/32 |
| CN | 113906495 | A | | 1/2022 | |
| CN | 114023260 | A | | 2/2022 | |
| CN | 114038420 | A | | 2/2022 | |
| CN | 114842806 | A | | 8/2022 | |

* cited by examiner

PIXEL DRIVING CIRCUIT AND METHOD OF DRIVING PIXEL DRIVING CIRCUIT, DISPLAY PANEL AND DISPLAY DEVICE

CROSS-REFERENCE TO RELATED APPLICATION(S)

This application is a Section 371 National Stage Application of International Application No. PCT/CN2023/088966, filed on Apr. 8, 2023, entitled "PIXEL DRIVING CIRCUIT AND METHOD OF DRIVING PIXEL DRIVING CIRCUIT, DISPLAY PANEL AND DISPLAY DEVICE", which claims priority to Chinese Patent Application No. 202210477952.7, filed on Apr. 29, 2022, the entire content of which is incorporated herein in its entirety by reference.

TECHNICAL FIELD

The present disclosure relates to a field of display technology, in particular to a pixel driving circuit and a method of driving the same, a display panel and a display device.

BACKGROUND

Organic light-emitting diode (OLED) display is one of the hot topics in the field of flat panel display research today.

The display panel of an OLED display uses a driving current provided by a driving pixel circuit to control to emit light. When a data voltage is applied to a driving transistor in the pixel driving circuit, the driving transistor outputs a current corresponding to the data voltage to the OLED display, thereby driving the OLED display to emit light with corresponding brightness. However, in low-frequency driving pixel circuits, problems of flickering more obviously often occur, and the quality of the display is deteriorated.

SUMMARY

The present disclosure provides a pixel driving circuit and a method of driving the same, a display panel and a display device.

According to an aspect of the present disclosure, a pixel driving circuit is provided and configured to drive a light-emitting element to emit light. The pixel driving circuit includes:

the pixel driving circuit includes:

a driving sub-circuit connected to the light-emitting element;

a data writing sub-circuit electrically connected to a data signal terminal, a scanning signal terminal and the driving sub-circuit, and configured to write a data signal from the data signal terminal into the driving sub-circuit and apply the data signal from the data signal terminal to a leakage current compensation point, under control of a scanning signal from the scanning signal terminal; and a light-emitting control sub-circuit electrically connected to the driving sub-pixel, a light-emitting control signal terminal and the light-emitting element, and configured to control the driving sub-circuit to output a driving current related to the data signal to the light-emitting element under control of a light-emitting control signal from the light-emitting control signal terminal, where a voltage of a control electrode of the driving sub-circuit is compensated by a voltage of the leakage current compensation point in a process of emitting light by the light-emitting element.

For example, the data writing sub-circuit includes a first transistor, a second transistor and a first dual gate transistor. The scanning signal terminal includes a first scanning signal terminal, a second scanning signal terminal and a third scanning signal terminal. The leakage current compensation point includes a first leakage current compensation point;

where a control electrode of the first transistor is electrically connected to the first scanning signal terminal, a first electrode of the first transistor is electrically connected to the data signal terminal, a second electrode of the first transistor is electrically connected to the first leakage current compensation point between dual gates of the first dual gate transistor; the gates of the first dual gate transistor are electrically connected to the second scanning signal terminal, a first electrode of the first dual gate transistor is connected to a predetermined initial voltage terminal, and a second electrode of the first dual gate transistor is electrically connected to the control electrode of the driving sub-circuit.

where a control electrode of the second transistor is electrically connected to the third scanning signal terminal, a first electrode of the second transistor is electrically connected to the second electrode of the first transistor, and a second electrode of the second transistor is electrically connected to an input terminal of the driving sub-circuit.

For example, the data writing sub-circuit further includes a third transistor and a second dual gate transistor. The scanning signal terminal includes a fourth scanning signal terminal. The leakage current compensation point further includes a second leakage current compensation point;

where a control electrode of the third transistor is electrically connected to the fourth scanning signal terminal, a first electrode of the third transistor is electrically connected to the second electrode of the first transistor, a second electrode of the third transistor is electrically connected to the second leakage current compensation point between dual gates of the second dual gate transistor; the gates of the second dual gate transistor are electrically connected to the third scanning signal terminal, a first electrode of the second dual gate transistor is electrically connected to the light-emitting control sub-circuit, and a second electrode of the second dual gate transistor is electrically connected to the control electrode of the driving sub-circuit.

For example, the data writing sub-circuit further includes a fourth transistor;

where a control electrode of the fourth transistor is electrically connected to the fourth scanning signal terminal, a first electrode of the fourth transistor is electrically connected to the second electrode of the first transistor, and a second electrode of the fourth transistor is electrically connected to the first leakage current compensation point.

For example, the data writing sub-circuit includes a first transistor, a second transistor and a first dual gate transistor, the scanning signal terminal includes a first scanning signal terminal and a third scanning signal terminal, and the leakage current compensation point includes a first leakage current compensation point;

where a control electrode of the first transistor is electrically connected to the first scanning signal terminal, a first electrode of the first transistor is electrically connected to a second electrode of the second transistor, and a second electrode of the first transistor is electrically connected to an input terminal of the driving sub-circuit; and where a control electrode of the second transistor is electrically connected to the third scanning signal terminal, a first electrode of the second transistor is electrically connected to the data signal terminal, and the second electrode of the second transistor is electrically connected to the first leakage current compensation point between dual gates of the first dual gate transistor.

For example, the data writing sub-circuit includes a first transistor, a second transistor, a third transistor and a first dual gate transistor, the leakage current compensation point includes a first leakage current compensation point, and the scanning signal terminal includes a third scanning signal terminal;

where a control electrode of the first transistor is electrically connected to the first leakage current compensation point between dual gates of the first dual gate transistor, a first electrode of the first transistor is electrically connected to a second electrode of the second transistor, and a second electrode of the first transistor is electrically connected to a first electrode of the third transistor.

where a control electrode of the second transistor is electrically connected to the third scanning signal terminal, a first electrode of the second transistor is electrically connected to the data signal terminal, and the second electrode of the second transistor is electrically connected to an input terminal of the driving sub-circuit;

where a control electrode of the third transistor is electrically connected to the third scanning signal terminal, and a second electrode of the third transistor is electrically connected to the first leakage current compensation point.

For example, the data writing sub-circuit includes a first transistor, a third transistor and a second dual gate transistor, the leakage current compensation point includes a first leakage current compensation point, and the scanning signal terminal includes a first scanning signal terminal and a third scanning signal terminal;

where a control electrode of the first transistor is electrically connected to the first scanning signal terminal, a first electrode of the first transistor is electrically connected to the data signal terminal, and a second electrode of the first transistor is electrically connected to the first leakage current compensation point located between the third transistor and the second dual gate transistor; and where a control electrode of the third transistor is electrically connected to a fourth scanning signal terminal, a first electrode of the third transistor is electrically connected to the first leakage current compensation point, and a second electrode of the third transistor is electrically connected to an input terminal of the driving sub-circuit.

For example, the data writing sub-circuit further includes a fifth transistor;

where a control electrode of the fifth transistor is electrically connected to a second scanning signal terminal, a first electrode of the fifth transistor is electrically connected to a predetermined initial voltage terminal, and a second electrode of the fifth transistor is electrically connected to an anode of the light-emitting element.

For example, the light-emitting control sub-circuit includes a sixth transistor and a seventh transistor;

where a control electrode of the sixth transistor is electrically connected to the light-emitting control signal terminal, a first electrode of the sixth transistor is electrically connected to a first power supply, and a second electrode of the sixth transistor is electrically connected to an input terminal of the driving sub-circuit; and where a control electrode of the seventh transistor is electrically connected to the light-emitting control signal terminal, a first electrode of the seventh transistor is electrically connected to an output terminal of the driving circuit, and a second electrode of the seventh transistor is electrically connected to the light-emitting element.

For example, the driving sub-circuit includes a driving transistor and a storage capacitor;

where a control electrode of the driving transistor is electrically connected to the data writing sub-circuit, a source of the driving transistor is electrically connected to the data writing sub-circuit, and a drain of the driving transistor is electrically connected to the light-emitting control sub-circuit; and where a first terminal of the storage capacitor is electrically connected to the control electrode of the driving transistor, and a second terminal of the storage capacitor is electrically connected to a first power supply.

For example, when the driving current drives the light-emitting element to emit light, the driving current is $K(Vdata-ELVDD)^2$, where K is a constant related to a driving transistor, Vdata is the data signal, and ELVDD is a first power supply voltage.

According to another aspect of the embodiments of the present disclosure, a display panel is provided, including:

a scanning signal line configured to provide a scanning signal;

a data signal line configured to provide a data signal;

an initialization signal line configured to provide an initialization signal;

a control signal line configured to provide a light-emitting control signal;

a pixel driving circuit according to the embodiments of the present disclosure; and a light-emitting element, where a first terminal of the light-emitting element is connected to the pixel driving circuit, and a second terminal of the light-emitting element is connected to a second power supply.

According to another aspect of the embodiments of the present disclosure, a display device is provided, including a display panel according to the embodiments of the present disclosure.

According to another aspect of the embodiments of the present disclosure, a pixel driving method is provided and applied to a pixel driving circuit according to the embodiments of the present disclosure. The pixel driving method includes:

in a first period, initializing the light-emitting element and the driving sub-circuit by an initialization signal from a predetermined initial voltage terminal, under control of a scanning signal from the scanning signal terminal;

in a second period, writing a data signal from the data signal terminal into the driving sub-circuit, under control of the scanning signal from the scanning signal terminal;

in a third period, applying the data signal from the data signal terminal to a leakage current compensation point, under control of the scanning signal from the scanning signal terminal; and in a fourth period, controlling the driving sub-circuit to output a driving current related to the data signal to the light-emitting element under control of a light-emitting control signal from a light-emitting control signal terminal, where in the fourth period, a voltage of a control electrode of the driving sub-circuit is compensated by a voltage of the leakage current compensation point.

According to another aspect of the embodiments of the present disclosure, a driving method is provided and applied to a display panel according to the embodiments of the present disclosure, including:

providing a scanning signal with an effective level to a scanning signal line, providing a light-emitting control signal with an effective level to a control signal line, and providing an initialization signal to a data signal line;

providing a scanning signal with an effective level to the scanning signal line and providing a data signal to the data signal line; and providing a light-emitting control signal with an effective level to the control signal line.

BRIEF DESCRIPTION OF THE DRAWINGS

Through the following description of the embodiments of the present disclosure with reference to the accompanying drawings, the above and other purposes, features and advantages of the embodiments of the present disclosure will be clearer. It should be noted that throughout the drawings, same elements are represented by same or similar reference numerals, in which.

DETAILED DESCRIPTION OF EMBODIMENTS

Figure 1:
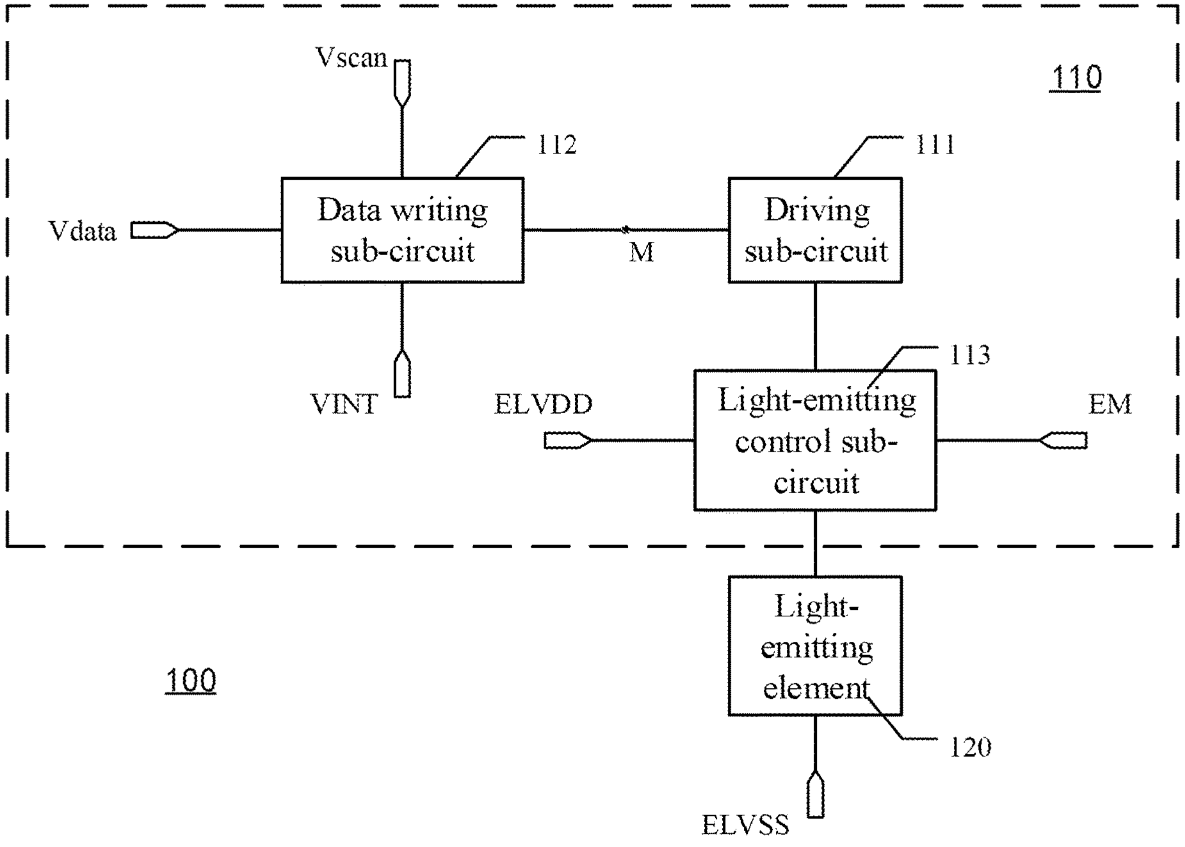
FIG. 1 shows a schematic diagram of a structure of a pixel circuit of an embodiment of the present disclosure.

In order to make purposes, technical solutions and advantages of embodiments of the present disclosure clearer, technical solutions in some embodiments of the present disclosure will be described clearly and completely in combination with accompanying drawings. Obviously, the described embodiments are only part of the embodiments of the present disclosure, not all of them. Based on the embodiments of the present disclosure provided, all other embodiments obtained by those of ordinary skill in the art without creative labor, fall within the scope of protection of the present disclosure. In the following description, some specific embodiments are only for descriptive purposes and should not be understood as limiting the present disclosure, but rather as examples of the embodiments of the present disclosure. When it may cause confusion in understanding of the present disclosure, conventional structures or constructions will be omitted. It should be noted that a shape and size of each component in the drawings do not reflect the true size and proportion, but only represent contents of the embodiments of the present disclosure.

Unless otherwise defined, the technical or scientific terms used in the embodiments of the present disclosure shall have the usual meaning understood by those of ordinary skill in the art. The terms "first", "second", and similar terms used in the embodiments of the present disclosure do not indicate any order, quantity, or importance, but are only used to distinguish different components.

Furthermore, in the description of the embodiments of the present disclosure, the terms "connected to" or "connection" may refer to two components being directly connected, or may refer to two components being connected through one or more other components, and the connection method is electrically connection or electrically coupling. In addition, these two components may also be connected or coupled through wired or wireless means.

According to different functions, the transistors used in the embodiments of the present disclosure may include switching transistors and driving transistors. Both the switching transistors and the driving transistors may be thin film transistors, field-effect transistors, or other devices with same characteristics. In an example of the present disclosure, a P-type driving transistor is taken as an example for description.

A source of the switching transistor and a drain of the switching transistor used in the embodiments of the present disclosure are symmetrical, so that the source of the switching transistor and the drain of the switching transistor may be interchanged. In the embodiments of the present disclosure, according to its function, a gate may be referred to as a control electrode, one of the source and the drain may be referred to as a first electrode, and the other one of the source and the drain may be referred to as a second electrode. In the following example, the switching transistor being a P-type thin film transistor is taken as an example for explanation. Those of skill in the art may understand that the embodiments of the present disclosure may obviously be applied to a case that the switching transistor is an N-type thin film transistor.

In addition, in the description of the embodiments of the present disclosure, the terms “first power supply voltage” and “second power supply voltage” are only used to distinguish an amplitude difference between the voltages of the two power supply. For example, in the following text, the “first power supply voltage” being a relatively high voltage and the “second power supply voltage” being a relatively low voltage are taken as an example for explanation. Those of skill in the art may understand that the present disclosure is not limited to this.

In a low-frequency driving pixel circuit, for example, when a refresh rate is 1 Hz, 5 Hz, 10 Hz, 15 Hz, 30 Hz or 60 Hz, since the time of emitting light by a single row of light-emitting elements in the display is long, leakage current phenomenon will occur in the gate of the driving transistor during this period. Since a potential of the gate of the driving transistor changes, it is possible to cause a more obvious flicker problem, thereby affecting the display effect of the display.

The embodiments of the present disclosure provide a pixel driving circuit, in which a data signal is applied to a leakage current compensation point after data is written into the driving sub-circuit, so that a voltage of a gate of the driving transistor in the driving sub-circuit may be compensated by the leakage current compensation point in a light-emitting phase, thereby providing a stable voltage for the gate of the driving transistor and improving the quality of the display screen.

The pixel driving circuit provided in the embodiments of the present disclosure includes a driving sub-circuit, a data writing sub-circuit and a light-emitting control sub-circuit. The driving sub-circuit is connected to a light-emitting element. The data writing sub-circuit is electrically connected to a data signal terminal, a scanning signal terminal and the driving sub-circuit, and configured to write a data signal from the data signal terminal into the driving sub-circuit and apply the data signal from the data signal terminal to a leakage current compensation point, under control of a scanning signal from the scanning signal terminal. The light-emitting control sub-circuit is electrically connected to the driving sub-circuit, a light-emitting control signal terminal and the light-emitting element, and configured to control the driving sub-circuit to output a driving current related to the data signal to the light-emitting element under control of a light-emitting control signal from the light-emitting control signal terminal. In a process of emitting light by the light-emitting element, a voltage of a control electrode of the driving sub-circuit is compensated by a voltage of the leakage current compensation point.

According to the technical solution of the embodiments of the present disclosure, a pixel driving circuit structure is provided. After the data is written into the driving sub-circuit, the data signal is applied to the leakage current compensation point, so that the voltage of the control electrode of the driving sub-circuit may be compensated by the leakage current compensation point in a light-emitting phase, thereby providing a stable voltage for the gate of the driving transistor and improving the quality of the display screen.

Hereinafter, various embodiments according to the present disclosure will be described in detail with reference to the accompanying drawings. It should be noted that, in the drawings, the same reference numerals are given to components that substantially have the same or similar structures and functions, and repeated descriptions about them will be omitted.

FIG. 1 shows a schematic diagram of a structure of a pixel circuit in an embodiment of the present disclosure.

As shown in FIG. 1, the pixel circuit 100 includes a pixel driving circuit 110 and a light-emitting element 120. The light-emitting element 120 may be an organic light-emitting diode (OLED) or may be other types of current driven light-emitting elements. The pixel driving circuit 110 includes a driving sub-circuit 111, a data writing sub-circuit 112 and a light-emitting control sub-circuit 113.

The driving sub-circuit 111 is connected to the light-emitting element 120. The driving sub-circuit 111 is configured to control a driving current that drives the light-emitting element 120 to emit light.

The data writing sub-circuit 112 is electrically connected to the data signal terminal Vdata, the scanning signal terminal Vscan and the driving sub-circuit 111. The data writing sub-circuit 112 may write a data signal from the data signal terminal Vdata into the driving sub-circuit 111 and apply the data signal from the data signal terminal Vdata to a leakage current compensation point M, under control of a scanning signal from the scanning signal terminal Vscan. The leakage current compensation point M is connected to a control electrode of the driving sub-circuit 111.

The light-emitting control sub-circuit 131 is electrically connected to the driving sub-circuit 111, a light-emitting control signal terminal EM and the light-emitting element 120. The light-emitting control sub-circuit 113 is configured to control the driving sub-circuit 111 to output a driving current related to the data signal to the light-emitting element 120 under control of a light-emitting control signal from the light-emitting control signal terminal EM.

According to the embodiment of the present disclosure, the light-emitting control sub-circuit 113 is connected to a first power supply ELVDD, and the light-emitting element 120 is connected to a second power supply ELVSS. For example, the first power supply VDD may provide a high voltage, and the second power supply ELVSS may provide a low voltage, such as grounding. A voltage provided by the first power supply is higher than a voltage provided by the second power supply.

The data writing sub-circuit 112 is also connected to a predetermined initial voltage terminal VINT, and configured to initialize, an anode of the light-emitting element 120 and a control electrode of the driving sub-circuit 111 by an initialization signal from the predetermined initial voltage terminal VINT under control of the scanning signal Vscan. The embodiments of the present disclosure include but are not limited to this.

In a process of emitting light by the light-emitting element 120, a voltage of a control electrode of the driving sub-circuit 111 is compensated by a voltage of the leakage current compensation point M, so that the control electrode of the driving sub-circuit 111 is provided with a stable voltage in the light-emitting phase.

It should be noted that in the explanation of the embodiments of the present disclosure, the leakage current compensation point M is not a real component in the circuit, but represents a node in a circuit in the circuit diagram. The symbol Vdata may represent both the data signal terminal and a level of the data signal. Similarly, the symbol Vscan may represent both the scanning signal terminal and a level of the scanning signal. The symbol VINT may represent both the predetermined initial voltage terminal and a voltage of the initial signal. The symbol ELVDD may represent both the first power supply and a first power supply voltage provided by the first power supply. The symbol ELVSS may represent both the second power supply and a second power supply voltage provided by the second power supply. The following embodiments are the same as this, which will not be repeated.

Figure 2A:
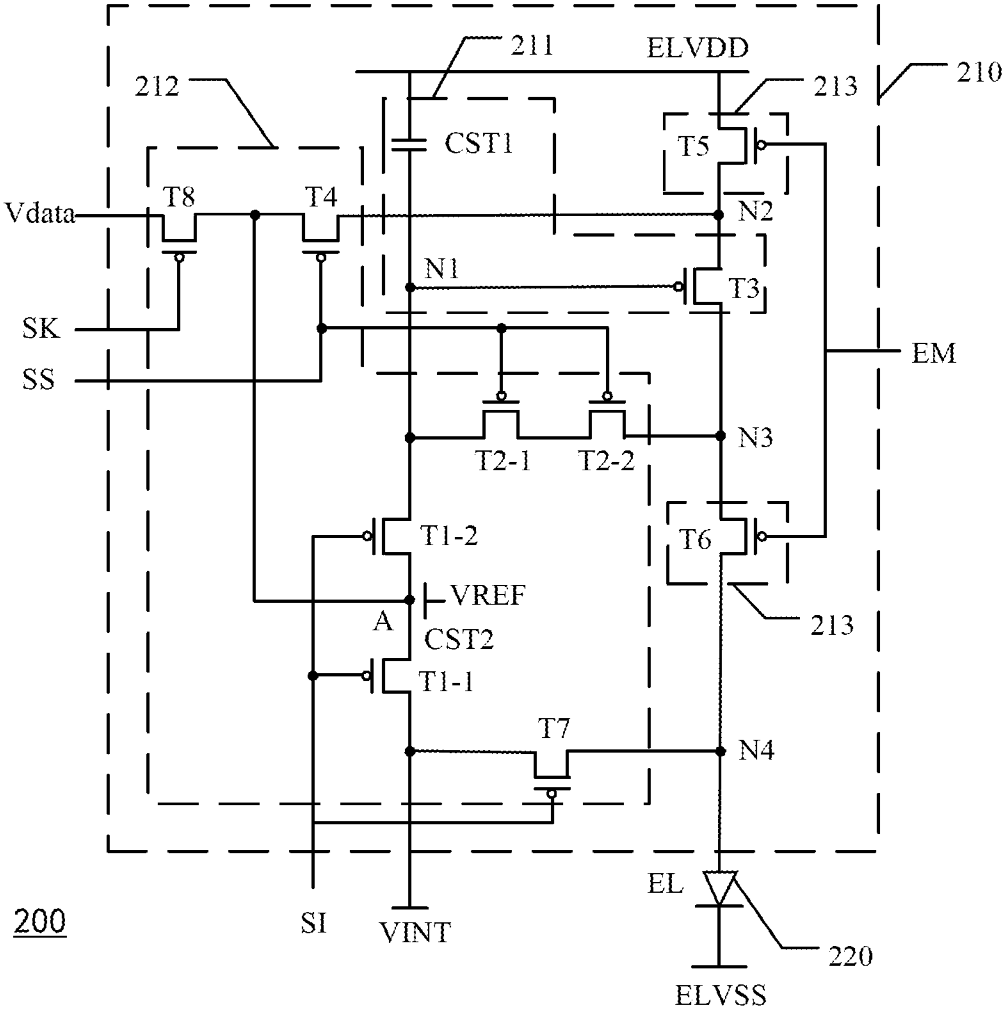
FIG. 2A shows a schematic diagram of a structure of another pixel circuit according to an embodiment of the present disclosure.

FIG. 2A shows a schematic diagram of a structure of another pixel circuit according to an embodiment of the present disclosure. As shown in FIG. 2A, the pixel circuit 200 includes a pixel driving circuit 210 and a light-emitting element 220. The light-emitting element 220 is shown as an OLED. For example, the light-emitting element OLED may be various types of OLEDs, such as top emitting OLED, bottom emitting OLED, dual-sided emitting OLED, etc. The light-emitting element OLED may emit red light, green light, blue light, or white light, etc. The embodiments of the present disclosure are not limited to this.

The pixel driving circuit 210 includes a driving sub-circuit 211, a data writing sub-circuit 212 and a light-emitting control sub-circuit 213.

The driving sub-circuit 211 includes a driving transistor T3 and a storage capacitor CST1.

A gate of the driving transistor T3 is electrically connected to the data writing sub-circuit 212 at a node N1, a source of the driving transistor T3 is electrically connected to the data writing sub-circuit 212 at a node N2, and a drain of the driving transistor T3 is electrically connected to the light-emitting control sub-circuit 213 at a node N3. A first terminal of the storage capacitor CST1 is electrically connected to the gate of the driving transistor T3 at the node N1, and a second terminal of the storage capacitor CST1 is electrically connected to a first power supply ELVDD.

The scanning signal terminal includes a first scanning signal terminal SK, a second scanning signal terminal SI and a third scanning signal terminal SS. The leakage current compensation point includes a first leakage current compensation point A.

The data writing sub-circuit 212 includes a first transistor T8, a second transistor T4, a first dual gate transistor T1 and a second dual gate transistor T2. The first dual gate transistor T1 includes a transistor T1-1 and a transistor T1-2. The second dual gate transistor T2 includes a transistor T2-1 and a transistor T2-2. The first transistor T8, the second transistor T4, the first dual gate transistor T1 and the second dual gate transistor T2 are implemented as switching transistors.

A gate of the first transistor T8 is electrically connected to the first scanning signal terminal SK, a first electrode of the first transistor T8 is electrically connected to the data signal terminal Vdata, and a second electrode of the first transistor T8 is electrically connected to the first leakage current compensation point A between the dual gates of the first dual gate transistor T1. The gates of the first dual gate transistor T1 are electrically connected to the second scanning signal terminal SI, a first electrode of the first dual gate transistor T1 is connected to a predetermined initial voltage terminal VINT, and a second electrode of the first dual gate transistor T1 is electrically connected to the gate of the driving transistor T3 in the driving sub-circuit 211 at the node N1. A gate of the second transistor T4 is electrically connected to the third scanning signal terminal SS, a first electrode of the second transistor T4 is electrically connected to the second electrode of the first transistor T8, and a second electrode of the second transistor T4 is electrically connected to the source of the driving transistor T3 in the driving sub-circuit 211 at the node N2. The gates of the second dual gate transistor T2 are electrically connected to the third scanning signal terminal SS, a first electrode of the second dual gate transistor T2 is electrically connected to the drain of the driving transistor T3 at the third node N3, and the second electrode of the second dual gate transistor T2 is electrically connected to the gate of the driving transistor T3 at the first node N1.

The data writing sub-circuit 212 also includes a fifth transistor T7. The fifth transistor T7 is implemented as a switching transistor. A gate of the fifth transistor T7 is electrically connected to the second scanning signal terminal SI, a first electrode of the fifth transistor T7 is electrically connected to the predetermined initial voltage terminal VINT, and a second electrode of the fifth transistor T7 is electrically connected to an anode of the light-emitting element 220 at a fourth node N4.

The light-emitting control sub-circuit 213 includes a sixth transistor T5 and a seventh transistor T6. The sixth transistor T5 and the seventh transistor T6 are implemented as switching transistors.

A gate of the sixth transistor T5 is electrically connected to a light-emitting control signal terminal EM, a first electrode of the sixth transistor T5 is electrically connected to a first power supply ELVDD, and a second electrode of the sixth transistor T5 is electrically connected to the source of the driving transistor T3 in the driving sub-circuit 211 at the node N1. A gate of the seventh transistor T6 is electrically connected to the light-emitting control signal terminal EM, a first electrode of the seventh transistor T6 is electrically connected to the drain of the driving transistor T3 in the driving sub-circuit 211 at the node N3, and a second electrode of the seventh transistor T6 is electrically connected to the light-emitting element 220 at the fourth node N4.

In the explanation of the embodiments of the present disclosure, the first node N1, the second node N2, the third node N3 and the fourth node N4 do not represent real components, but rather represent convergence points of relevant circuit connections in the circuit diagram.

Figure 2B:
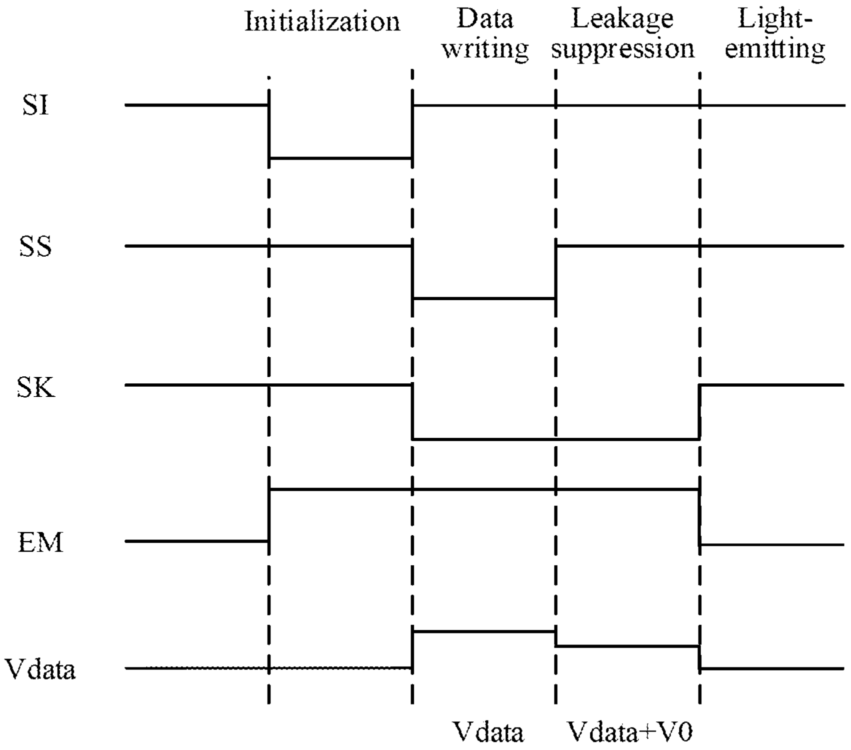
FIG. 2B shows a signal timing diagram of the pixel circuit in FIG. 2A.

FIG. 2B shows a signal timing diagram of the pixel circuit in FIG. 2A. As shown in FIG. 2B, a display process of each frame of an image may include an initialization phase, a data writing phase, a leakage current compensation phase and a light-emitting phase. FIG. 2B shows timing waveforms of each signal in each phase.

Figure 2C:
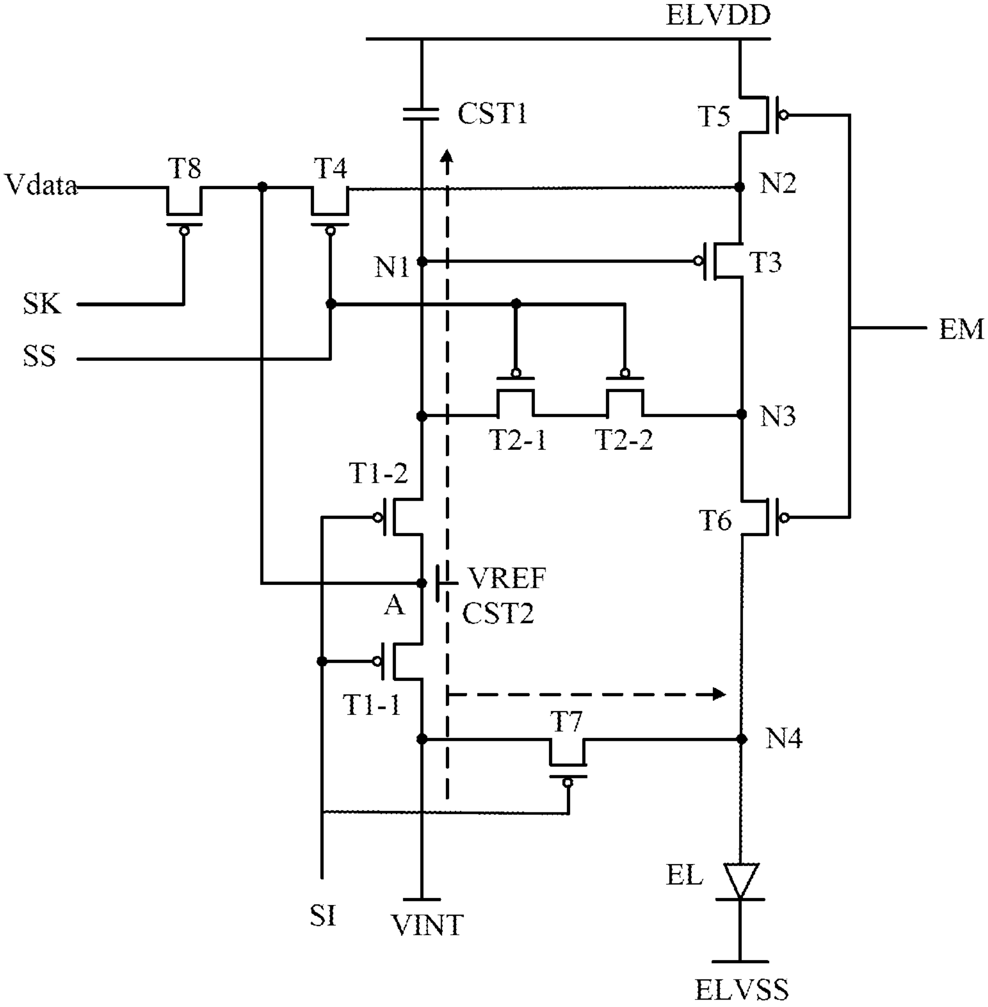
FIG. 2C to FIG. 2F show equivalent circuit diagrams of a pixel circuit in different phases according to an embodiment of the present disclosure.
Figure 2D:
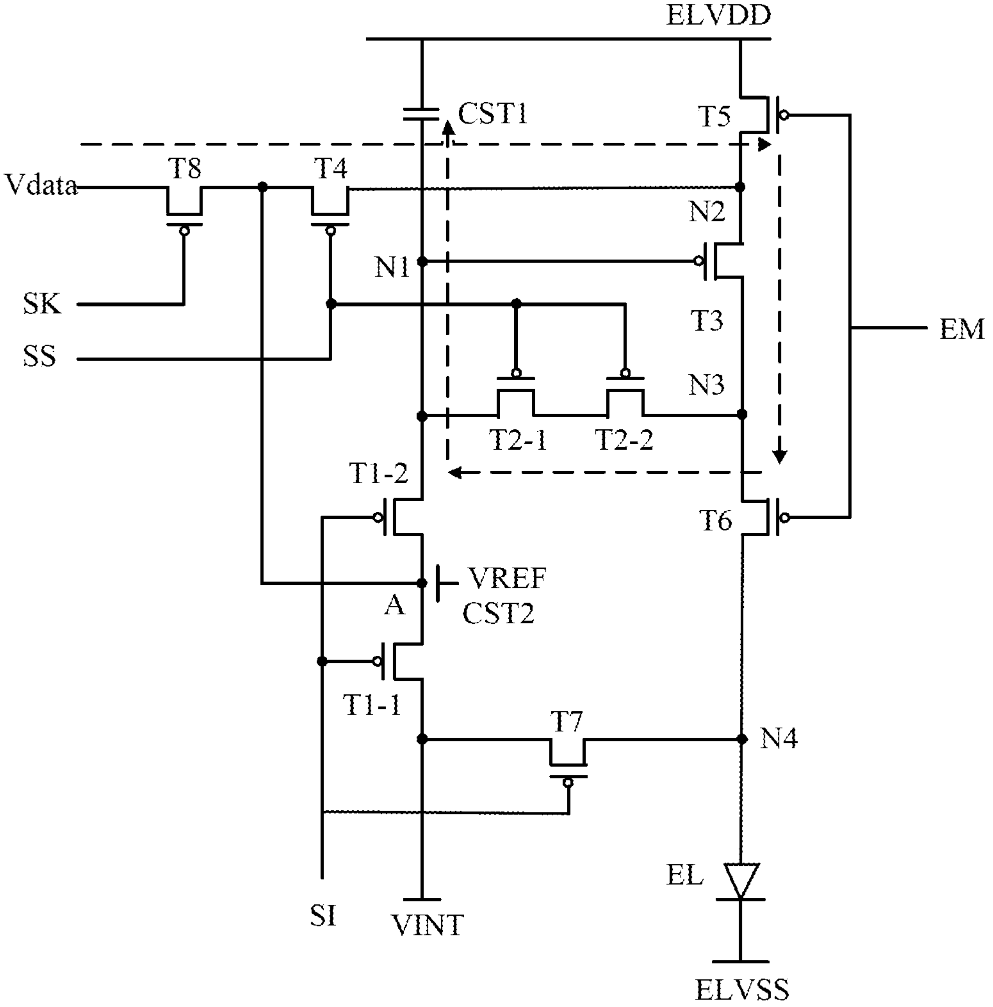
Figure 2E:
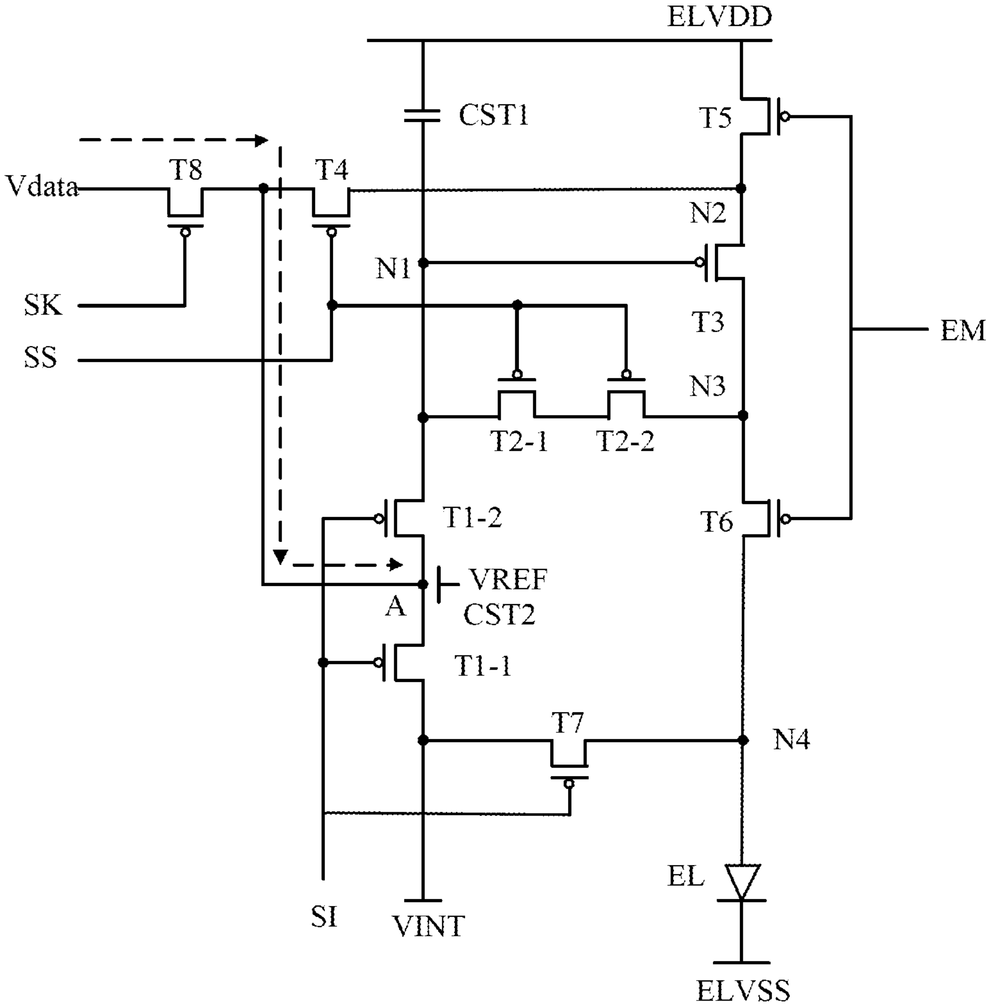
Figure 2F:
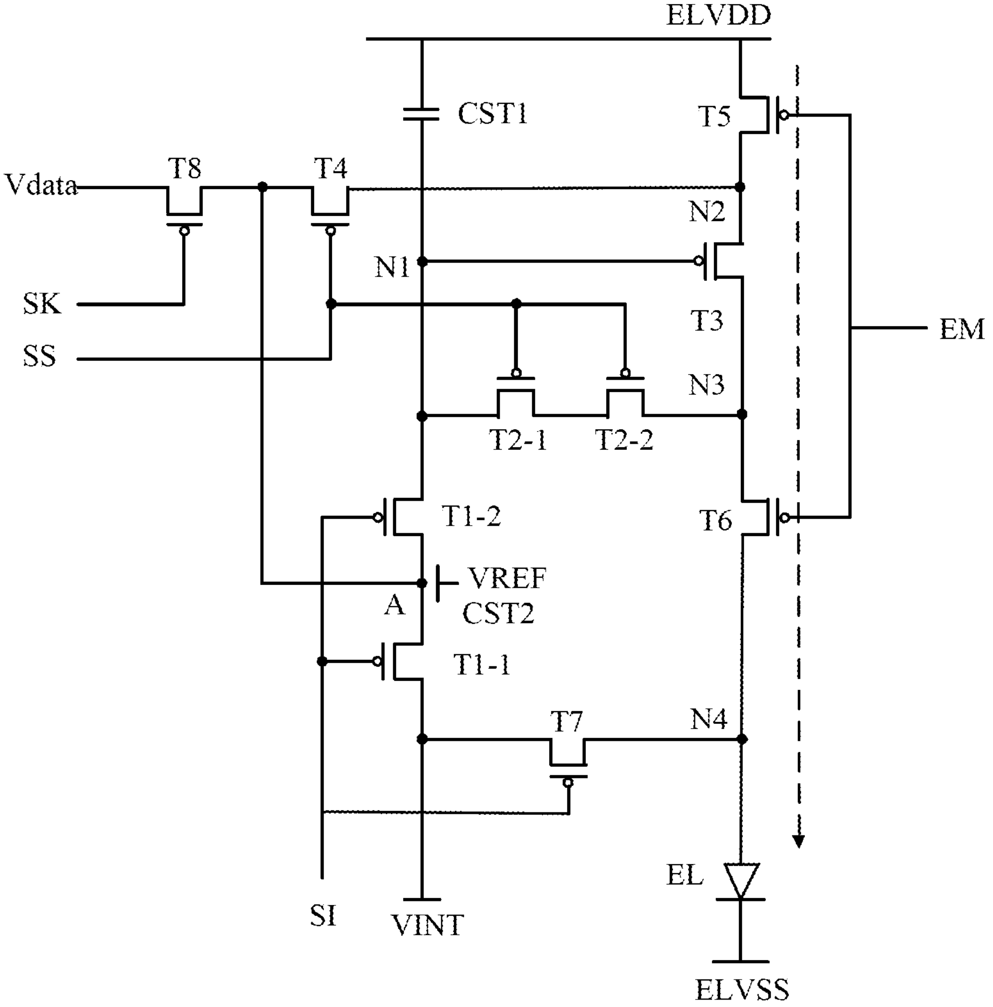

FIG. 2C shows an equivalent circuit diagram of a pixel driving circuit in an initialization phase according to an embodiment of the present disclosure. FIG. 2D shows an equivalent circuit diagram of a pixel driving circuit in a data writing phase according to an embodiment of the present disclosure. FIG. 2E shows an equivalent circuit diagram of a pixel driving circuit in a leakage current compensation phase according to an embodiment of the present disclosure. FIG. 2F shows an equivalent circuit diagram of a pixel driving circuit in a light-emitting phase according to an embodiment of the present disclosure. Dashed lines with arrows in FIG. 2C to FIG. 2F represent the direction of current of the pixel circuit in corresponding phases.

Next, with reference to FIG. 2A to FIG. 2F, operations of the pixel driving circuit according to the embodiment of the present disclosure will be described in detail.

In the initialization phase, the second scanning signal SI is at low level, which is an effective level, and other scanning signals are at high level, and the light-emitting control signal is at high level. Under control of the second scanning signal SI, the first dual gate transistor T1 and the fifth transistor T7 are turned on. The first transistor T8 is turned off by a high level of the first scanning signal SK. The second transistor T4 and the second dual gate transistor T2 are turned off by a high level of the third scanning signal SS. The sixth transistor T5 and the seventh transistor T6 are turned off by a high level of the light-emitting control signal EM.

As shown in FIG. 2C, in the initialization phase, the first dual gate transistor T1 is turned on, and the initialization signal is written to the first node N1 along an initialization path from the predetermined initial voltage terminal VINT to the first node N1 via the first dual gate transistor T1, thereby initializing a voltage of the gate of the driving transistor T3 as VINT. The fifth transistor T7 is turned on, and the initialization signal is written into the fourth node N4 along an initialization path from the predetermined initial voltage terminal VINT to the fourth node N4, thereby initializing an anode of the light-emitting element EL as VINT.

It may be understood that a voltage difference between the initial signal terminal VINT and the second power supply terminal ELVSS (VINT−ELVSS) is less than a threshold voltage Voled of the light-emitting element EL. ELVSS is a voltage of a second terminal of the light-emitting element OLED, and Voled is a light-emitting threshold voltage of the light-emitting element EL. Thus, it is possible to ensure that the light-emitting element EL will not emit light in the initialization phase.

After the initialization phase, the first node N1 and the fourth node N4 are both at the voltage of the initialization signal VINT. The initialization signal VINT is a low level signal, for example, may be grounded or other low level signal. The first terminal of the storage capacitor CST1 connected to the gate of the driving transistor T3 is initialized, and the second terminal of the storage capacitor CST1 is connected to the first power supply ELVDD. At this time, the voltage of two terminals of the storage capacitor CST1 is $V_C$=ELVDD-$V_{N1}$==ELVDD−VINT. The first power supply voltage ELVDD is a high potential voltage relative to VINT, thereby allowing data signals in subsequent phases to be stored more quickly and reliably in the storage capacitor CST1.

In the data writing phase, the first scanning signal SK and the third scanning signal SS are at low level, which is an effective level, other scanning signals are at high level, and the light-emitting control signal is at high level. Under control of the first scanning signal SK, the first transistor T8 is turned on. Under control of the third scanning signal SS, the second transistor T4 and the second dual gate transistor T2 are turned on. The first dual gate transistor T1 and the fifth transistor T7 are turned off by the high level of the second scanning signal SI. The sixth transistor T5 and the seventh transistor T6 are turned off by the high level of the light-emitting control signal EM.

As shown in FIG. 2D, in the data writing phase, the first data signal is input from the data signal terminal Vdata, and a potential amplitude of the first data signal is Vdata. The first transistor T8, the second transistor T4, the driving transistor T3 and the second dual gate transistor T2 are turned on. The first data signal is written to the first node N1 along a data writing path from the data signal terminal Vdata to the first node N1 via the first transistor T8, the second transistor T4, the driving transistor T3 and the second dual gate transistor T2. The process of writing the first data signal into the first node N1 is to charge the storage capacitor CST1. At this time, the potential of the first node N1 increases. The potential of the second node N2 remains at Vdata, while according to characteristics of the driving transistor T3, when the potential of the first node N1 increases to Vdata+Vth, the driving transistor T3 is turned off, and the charging process is completed. It should be noted that Vth represents the threshold voltage of the driving transistor T3. Since the driving transistor T3 is explained by taking a P-type transistor as an example in this embodiment, the threshold voltage Vth may be a negative value.

After the data writing phase, the potentials of the first node N1 and the third node N3 are both Vdata+Vth. At this time, voltage information with the data signal Vdata and the threshold voltage Vth is stored in the storage capacitor CST1 for subsequent control of the gate of the driving transistor T3 in the light-emitting phase.

In the leakage current compensation phase, the first scanning signal SK is at low level, which is an effective level, other scanning signals are at high level, and the light-emitting control signal is at high level. Under control of the first scanning signal SK, the first transistor T8 is turned on. The second transistor T4 and the second dual gate transistor T2 are turned off by the high level of the third scanning signal SS. The first dual gate transistor T1 and the fifth transistor T7 are turned off by the high level of the second scanning signal SI. The sixth transistor T5 and the seventh transistor T6 are turned off by the high level of the light-emitting control signal.

As shown in FIG. 2E, in the leakage current compensation phase, the second data signal is input from the data signal terminal Vdata, and a potential amplitude of the second data signal is Vdata+V0. The first transistor T8 is turned on, and the second data signal is written into the first leakage current compensation point A from the data signal terminal to the first leakage current compensation point A via a leakage current compensation path of the first transistor T8. A potential of the first leakage current compensation point A may be maintained by a parasitic capacitance between the gates of the first dual gate transistor T1 and the source or drain of the first dual gate transistor T1, or may be maintained by providing a capacitor CST2 at the first leakage current compensation point A. In a case that a capacitor CST2 is provided at the first leakage current compensation point A, a first terminal of the capacitor CST2 is the first leakage current compensation point A, which is connected to a second electrode of the first transistor T8, and a second terminal of the capacitor CST2 is connected to any stable voltage VREF. The stable voltage VREF may be ELVSS, VINT, or ELVDD, or other stable voltages. While charging the first leakage current compensation point A, the capacitor CST2 is charged. At this time, the potential of the first leakage current compensation point A increases until the potential of the first leakage current compensation point A increases to Vdata+V0, and the charging process is completed.

It should be noted that voltage V0 may be a dynamically changing value, and an average amplitude of voltage V0 is approximately equal to the threshold voltage Vth of the driving transistor T3. An amplitude of voltage V0 may be V0≈Vth±0.5, or V0≈Vth±1. The amplitude of voltage V0 may be determined by testing the threshold voltage Vth of the driving transistor T3. For example, test points may be arbitrarily selected on a non-display region of the display panel (the border region on the periphery of the display region) for detecting a test element group (TEG), and the average threshold voltage Vth of the driving transistor T3 is calculated to determine a specific value of V0. An aspect ratio of TEG is selected to be consistent with an aspect ratio of the display region. A range of the voltage V0 may be optimized accurately through simulation.

After the leakage current compensation phase, the potential VA of the first leakage current compensation point A is Vdata+V0. At this time, a voltage $V_{N1}$ of the first node N1 remains at Vdata+Vth. The potential $V_A$ of the first leakage current compensation point A is implemented to compensate for the threshold voltage $V_{N1}$ of the first node N1 in the subsequent light-emitting phase.

In the light-emitting phase, the light-emitting control signal EM is at low level, which is an effective level, and the scanning signal is at high level. Under control of the light-emitting control signal EM, the sixth transistor T5 and the seventh transistor T6 are turned on. The driving transistor T3 is turned on under driving of the voltage signal stored in the storage capacitor CST1. The first transistor T8 is turned off by the high level of the first scanning signal SK. The second transistor T4 and the second dual gate transistor T2 are turned off by the high level of the third scanning signal SS. The first dual gate transistor T1 and the fifth transistor T7 are turned off by the high level of the second scanning signal SI.

As shown in FIG. 2F, in the light-emitting phase, the sixth transistor T5 and the seventh transistor T6 are turned on, and the driving current is applied to the light-emitting element EL along a light-emitting path from the first power supply to the light-emitting element EL via the sixth transistor T5, the driving transistor T3, and the seventh transistor T6, so as to allow the light-emitting element EL to emit light. At this time, the second node N2 is connected to the first power supply ELVDD, and the first power supply voltage of the first power supply ELVDD is applied to the second node N2, with $V_{N2}$=ELVDD. $V_A$ and $V_{N1}$ remain unchanged, $V_A$=Vdata+V0, $V_{N1}$=Vdata+Vth, $V_A \approx V_{N1}$, so that the VSD of the transistor T1-2 in the first dual gate transistor is VSD≈0. At this time, the leakage current flowing through the transistor T1-2 is extremely small, and a gate potential of the driving transistor T3 may remain stable, thereby reducing the possibility of flicker and improving the display quality.

The driving current $I_{DS}$ flowing through the driving transistor Td may be calculated based on $I_{DS}=K(V_{gs}-V_{th})^2$. The voltage Vgs between the gate of the driving transistor T3 and the source of the driving transistor T3 is the same as the voltage of the first node N1, and the voltage of the source of the driving transistor T3 is the same as the voltage of the second node N2. $Vgs=V_{N1}-V_{N2}$=Vdata+Vth−VDD, thus $I_{DS}=K(Vgs-Vth)^2=K(Vdata+Vth-VDD-Vth)^2=K(Vdata-VDD)^2$. $K=(\mu WC_{ox})/2L$, where K is a parameter related to a process and design of the driving transistor T3. Once the driving transistor T3 is manufactured, this parameter K is a constant.

It may be seen that the above driving current IDS is independent of the threshold voltage Vth of the driving transistor T3. Therefore, according to the embodiment of the present disclosure, the threshold Vth of the driving transistor T3 may be compensated by the pixel driving circuit, so that it is possible to solve the problem of threshold voltage drift caused by the process and long-term operation of the driving transistor T3, and eliminate its impact on the driving current $I_{DS}$, thereby improving the display effect of the display device using the driving transistor T3.

In the example of FIG. 2A, the first transistor T8, the second transistor T4, the fifth transistor T7, the sixth transistor T5, the seventh transistor T6, the first dual gate transistor T1, the second dual gate transistor T2, and the driving transistor T3 are all P-type transistors, such as a thin film transistor with an active layer being low-temperature doped polycrystalline silicon (LTPS). Those of skill in the art may understand that, according to the embodiment of the present disclosure, the first transistor T8, the second transistor T4, the fifth transistor T7, the sixth transistor T5, the seventh transistor T6, the first dual gate transistor T1, the second dual gate transistor T2 and the driving transistor T3 may also be N-type transistors, such as a thin film transistor with an active layer of indium gallium zinc oxide (IGZO), and the level of a gate conduction signal of each transistor may be changed accordingly.

In addition, those of skill in the art may understand that storage capacitors may be separately implemented as a single capacitor or a plurality of parallel or series capacitor units, as long as their corresponding functions may be achieved.

Figure 3A:
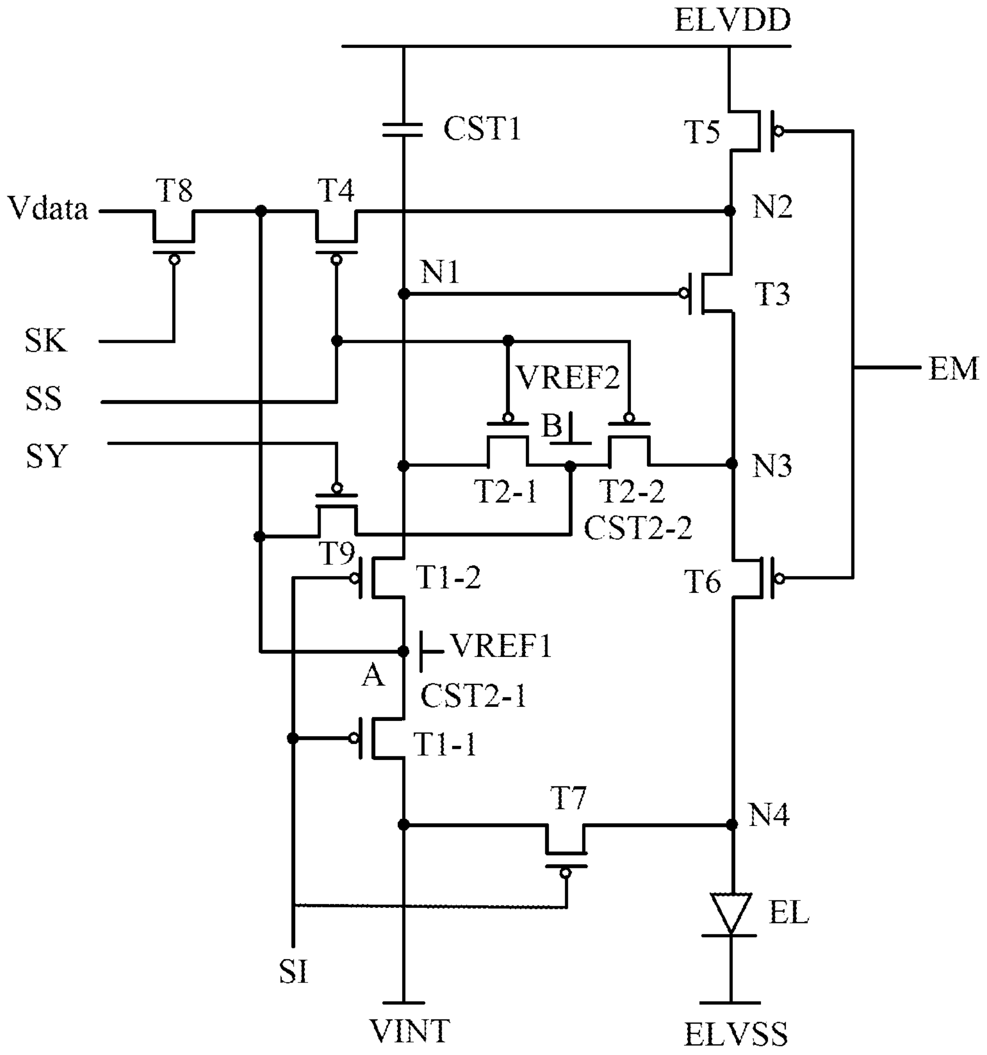
FIG. 3A shows a schematic diagram of a structure of another pixel circuit according to an embodiment of the present disclosure.

FIG. 3A shows a schematic diagram of a structure of a pixel circuit according to another embodiment of the present disclosure. As shown in FIG. 3A, the pixel circuit includes transistors T1 to T9, a light-emitting element EL, a storage capacitors (CST1) and capacitors (CST2-1 and CST2-2). The scanning signal terminal includes a first scanning signal terminal SK, a second scanning signal terminal SI, a third scanning signal terminal SS and a fourth scanning signal terminal SN. The leakage current compensation point includes a first leakage current compensation point A and a second leakage current compensation point B.

In the embodiment of the present disclosure, the transistors T1 to T8, the storage capacitor CST1, the capacitor CST2-1, the scanning signal terminals (the first scanning signal terminal SK, the second scanning signal terminal SI and the third scanning signal terminal SS), a predetermined initial voltage terminal VINT, a control signal terminal EM, a first power supply ELVDD and a second power supply ELVSS have similar functions and similar connection relationships with the transistors T1 to T8, the storage capacitor CST1, and the capacitor CST2, the scanning signal terminals (the first scanning signal terminal SK, the second scanning signal terminal SI and the third scanning signal terminal SS), the predetermined initial voltage terminal VINT, the control signal terminal EM, the first power supply ELVDD, and the second power supply ELVSS in FIG. 2A, respectively. For simplicity, the present disclosure will not be repeated.

As shown in FIG. 3A, the pixel driving circuit also includes a third transistor T9. The scanning signal terminal also includes a fourth scanning signal terminal SY. The leakage current compensation point also includes a second leakage current compensation point B.

A gate of the third transistor T9 is electrically connected to the fourth scanning signal terminal SY, a first electrode of the third transistor T9 is electrically connected to a second electrode of the first transistor T8, and a second electrode of the third transistor T9 is electrically connected to the second leakage current compensation point B between the dual gates of the second dual gate transistor T2.

Figure 3B:
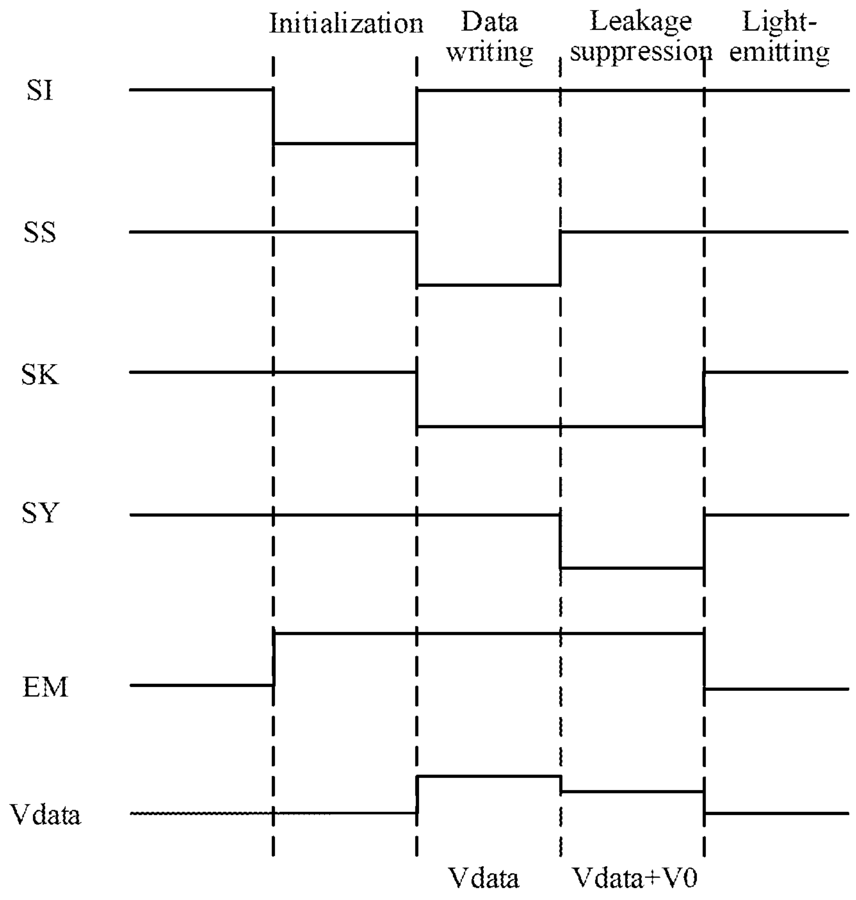
FIG. 3B shows a signal timing diagram of the pixel circuit in FIG. 3A.

FIG. 3B shows a signal timing diagram of the pixel circuit in FIG. 3A. As shown in FIG. 3B, a display process of each frame of an image includes an initialization phase, a data writing phase, a leakage current compensation phase and a light-emitting phase. FIG. 3B shows timing waveforms of each signal in each phase.

In the embodiment of the present disclosure, the initialization phase, the data writing phase and the light emitting phase are similar to the initialization phase, the data writing phase and the light emitting phase in FIG. 2B, respectively. For simplicity, the present disclosure will not be repeated.

As shown in FIG. 3B, in the leakage current compensation phase, the first scanning signal SK is at low level, which is an effective level, and the fourth scanning signal SY is at low level, which is an effective level. Under control of the first scanning signal SK, the first transistor T8 is turned on. Under control of the fourth scanning signal SY, the third transistor T9 is turned on.

In the leakage current compensation phase, the second data signal is input from the data signal terminal Vdata, and the potential amplitude of the second data signal is Vdata+V0. The first transistor T8 is turned on, and the third transistor T9 is turned on. The second data signal is written into the first leakage current compensation point A along a path from the data signal terminal Vdata to the first leakage current compensation point A via the first transistor T8. The second data signal is also written into the second leakage current compensation point B along a leakage current compensation path from the data signal terminal Vdata to the second leakage current compensation point B via the first transistor T8 and the third transistor T9.

The method of maintaining the potential of the first leakage current compensation point A is similar to the process in the previous embodiments, which will not be repeated in the present disclosure. The potential of the second leakage current compensation point B may be maintained by a parasitic capacitance between the gates of the second dual gate transistor and the source or drain of the second dual gate transistor T2, or by providing a capacitor CST2-2 at the second leakage current compensation point B. In the case that a capacitor CST2-2 is provided at the second leakage current compensation point B, a first terminal of the capacitor CST2-2 is the second leakage current compensation point B, and connected to the second electrode of the first transistor T8, and a second terminal of the capacitor CST2-2 is connected to any stable voltage VREF. The stable voltage VREF may be ELVSS, VINT, or ELVDD, or may be other stable voltages. The capacitor CST2-2 is charged while charging the second leakage current compensation point B. At this time, the potential of the second leakage current compensation point B increases until the potential of the second leakage current compensation point B increases to Vdata+V0, and the charging process is completed.

After the leakage current compensation phase, the potential $V_B$ of the second leakage current compensation point B is Vdata+V0. At this time, the voltage $V_{N1}$ of the first node N1 remains at Vdata+Vth. The potential $V_B$ of the second leakage current compensation point B and the potential $V_A$ of the first leakage current compensation point A are both implemented to compensate for the threshold voltage $V_{N1}$ of the first node N1 in the subsequent light-emitting phase.

In the light-emitting phase, $V_A=V_B=$Vdata+V0, $V_{N1}=$Vdata+Vth, $V_A \approx V_B \approx V_{N1}$, so that the VSD of the transistor T1-2 in the first dual gate transistor is VSD≈0, and the VSD of the transistor T2-1 in the second dual gate transistor is VSD≈0. At this time, the leakage current flowing through the transistors T1-2 and T2-1 is extremely small, and the gate potential of the driving transistor T3 may remain stable, thereby reducing the possibility of flicker and improving the display quality.

Figure 4A:
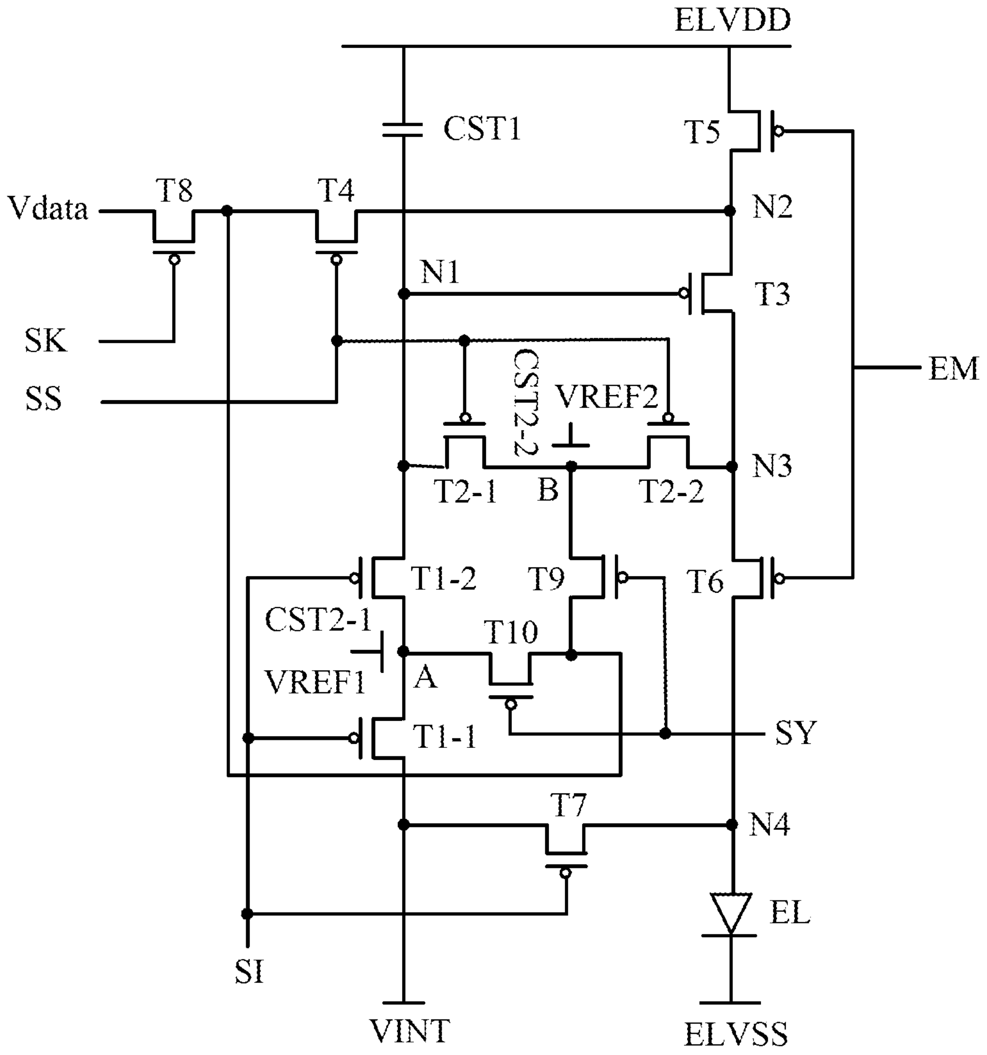
FIG. 4A shows a schematic diagram of a structure of another pixel circuit according to an embodiment of the present disclosure.

FIG. 4A shows a schematic diagram of a structure of a pixel circuit according to another embodiment of the present disclosure. As shown in FIG. 4A, the pixel circuit includes transistors T1 to T10, a light-emitting element EL, a storage capacitor CST1 and capacitors (CST2-1 and CST2-2). The scanning signal terminal includes a first scanning signal terminal SK, a second scanning signal terminal SI, a third scanning signal terminal SS, and a fourth scanning signal terminal SN. The leakage current compensation point includes a first leakage current compensation point A and a second leakage current compensation point B.

In the embodiment of the present disclosure, the transistors T1 to T9, the storage capacitor CST1, the capacitors (CST2-1 and CST2-2), the scanning signal terminals (the first scanning signal terminal SK, the second scanning signal terminal SI, the third scanning signal terminal SS and the fourth scanning signal terminal SN), the predetermined initial voltage terminal VINT, the control signal terminal EM, the first power supply ELVDD and the second power supply ELVSS have similar functions and connection relationships to the transistors T1 to T8, the storage capacitor CST1, the capacitors (CST2-1 and CST2-2), the scanning signal terminals (the first scanning signal terminal SK, the second scanning signal terminal SI, the third scanning signal terminal SS and the fourth scanning signal terminal SN), the predetermined initial voltage terminal VINT, the control signal terminal EM, the first power supply ELVDD and the second power supply ELVSS in FIG. 3A, respectively. For simplicity, the present disclosure will not be repeated.

As shown in FIG. 4A, the pixel driving circuit also includes a fourth transistor T10.

A gate of the fourth transistor T10 is electrically connected to the fourth scanning signal terminal SY, a first electrode of the fourth transistor T10 is electrically connected to the second electrode of the first transistor T8, and a second electrode of the fourth transistor T10 is electrically connected to the first leakage current compensation point A between the dual gates of the first dual gate transistor T1.

Figure 4B:
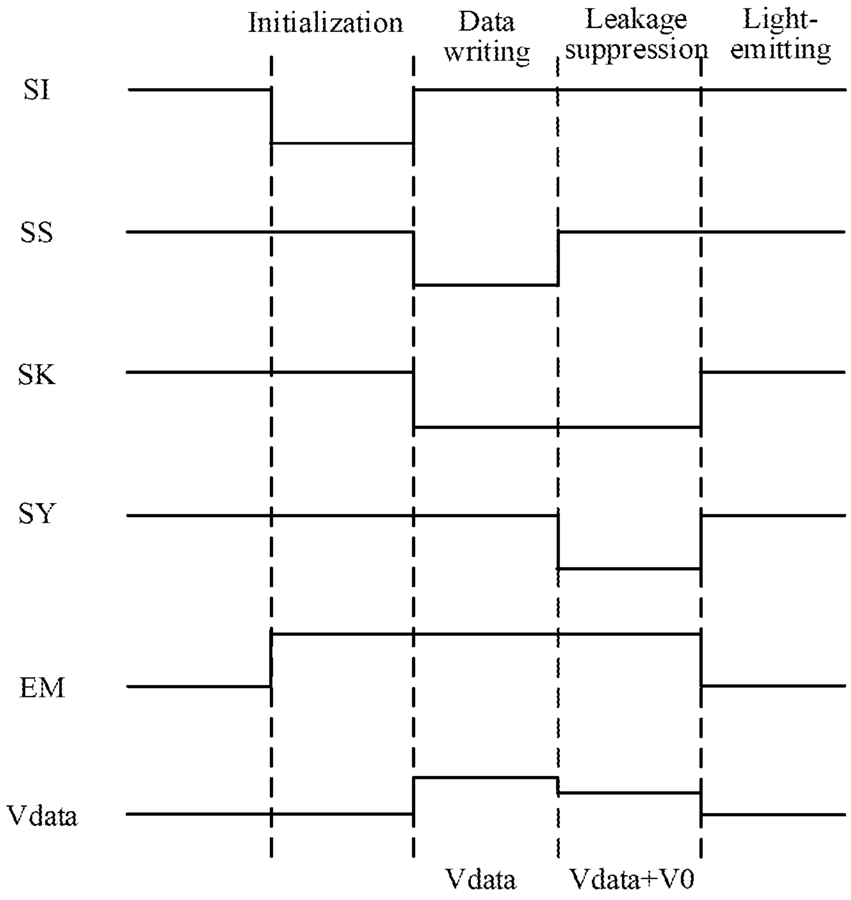
FIG. 4B shows a signal timing diagram of the pixel circuit in FIG. 4A.

FIG. 4B shows a signal timing diagram of the pixel circuit in FIG. 4A. As shown in FIG. 4B, a display process of each frame of the image includes an initialization phase, a data writing phase, a leakage current compensation phase and a light-emitting phase. FIG. 4B shows timing waveforms of each signal in each phase.

In the embodiment of the present disclosure, the initialization phase, the data writing phase and the light emitting phase are similar to the initialization phase, the data writing phase and the light emitting phase in FIG. 3B, respectively. For simplicity, the present disclosure will not be repeated.

As shown in FIG. 4B, in the leakage current compensation phase, the low levels of the first scanning signal SK and the fourth scanning signal SY are effective levels. Under control of the first scanning signal SK, the first transistor T8 is turned on. Under control of the fourth scanning signal SY, the fourth transistor T10 is turned on.

In the leakage current compensation phase, the second data signal is input from the data signal terminal Vdata, and the potential amplitude of the second data signal is Vdata+V0. The first transistor T8 and the fourth transistor T10 are turned on, and the second data signal is written into the first leakage current compensation point A along a leakage compensation path from the data signal terminal Vdata to the first leakage current compensation point A via the first transistor T8 and the fourth transistor T10. At this time, the potential of the first leakage current compensation point A increases until the potential of the first leakage current compensation point A increases to Vdata+V0.

The process of writing the second data signal into the second leakage current compensation point B is similar to the process in the previous embodiments, which will not be repeated in the present disclosure.

After the leakage current compensation phase, the potential $V_B$ of the second leakage current compensation point B is Vdata+V0. At this time, the voltage $V_{N1}$ of the first node N1 remains at Vdata+Vth. The potential $V_B$ of the second leakage current compensation point B and the potential $V_A$ of the first leakage current compensation point A are both implemented to compensate for the threshold voltage $V_{N1}$ of the first node N1 in the subsequent light-emitting phase.

In the light-emitting phase, $V_A=V_B$=Vdata+V0, $V_{N1}$=Vdata+Vth, $V_A \approx V_B \approx V_{N1}$, so that the VSD of the transistor T1-2 in the first dual gate transistor is VSD≈0, and the VSD of the transistor T2-1 in the second dual gate transistor is VSD≈0. At this time, the leakage current flowing through the transistors T1-2 and T2-1 is extremely small, and the gate potential of the driving transistor T3 may remain stable, thereby reducing the possibility of flicker and improving the display quality.

Figure 5A:
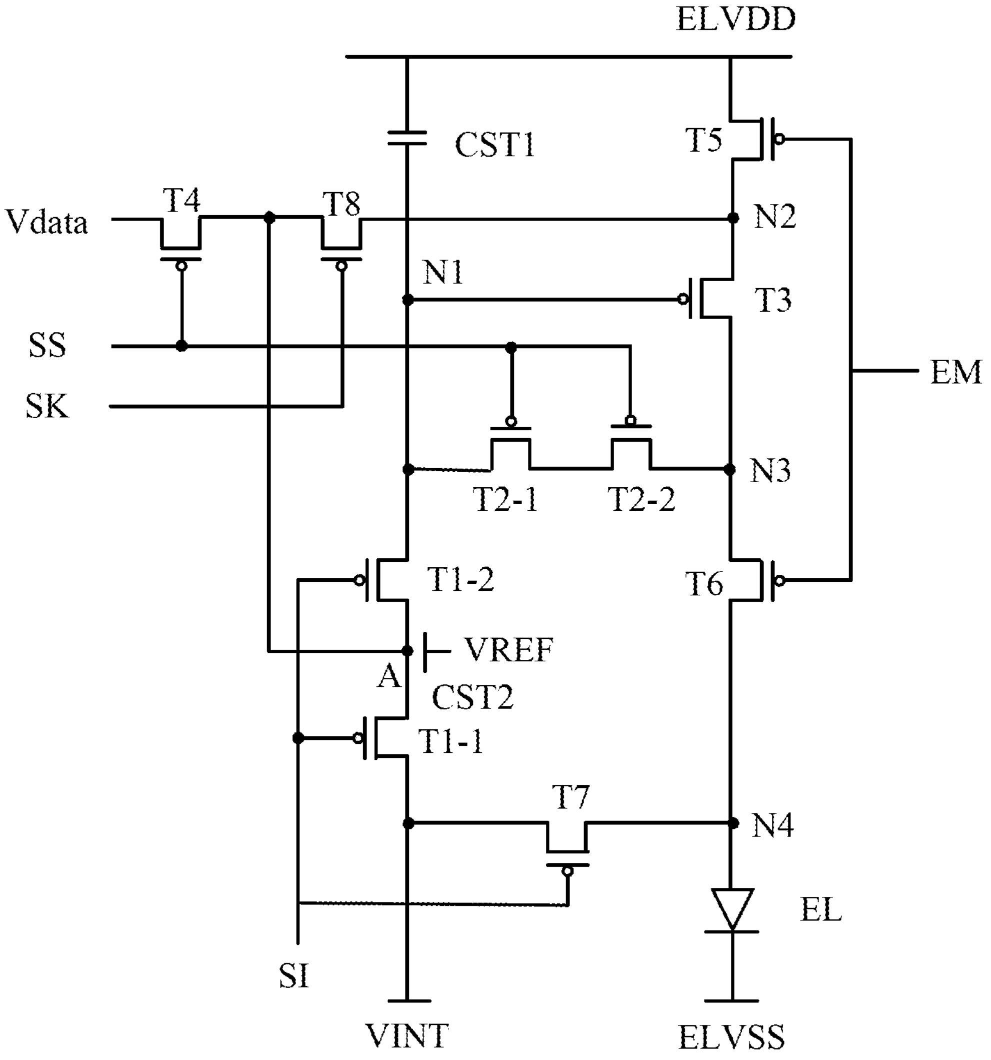
FIG. 5A shows a schematic diagram of a structure of another pixel circuit according to an embodiment of the present disclosure.

FIG. 5A shows a schematic diagram of a structure of a pixel circuit according to another embodiment of the present disclosure. As shown in FIG. 5A, the pixel circuit includes transistors T1~T8, a light-emitting element EL, and storage capacitors (CST1 and CST2). The scanning signal terminal includes a first scanning signal terminal SK, a second scanning signal terminal SI, and a third scanning signal terminal SS. The leakage current compensation point includes a first leakage current compensation point A.

In the embodiment of the present disclosure, the transistors (T1~T3 and T5~T7), the storage capacitor CST1, the capacitor CST2, the scanning signal terminals (the first scanning signal terminal SK, the second scanning signal terminal SI and the third scanning signal terminal SS), the predetermined initial voltage terminal VINT, the control signal terminal EM, the first power supply ELVDD and the second power supply ELVSS have similar functions and connection relationships to the transistors (T1~T3 and T5~T7), the storage capacitor CST1, the capacitor CST2, the scanning signal terminal (the first scanning signal terminal SK, the second scanning signal terminal SI and the third scanning signal terminal SS), the predetermined initial voltage terminal VINT, the control signal terminal EM, the first power supply ELVDD and the second power supply ELVSS in FIG. 2A. For simplicity, the present disclosure will not be repeated.

As shown in FIG. 5A, a gate of the first transistor T8 is electrically connected to the first scanning signal terminal SK, a first electrode of the first transistor T8 is electrically connected to a second electrode of the second transistor T4, and a second electrode of the first transistor T8 is electrically connected to a source of the driving transistor T3 at the second node N2. A gate of the second transistor T4 is electrically connected to the third scanning signal terminal SS, a first electrode of the second transistor T4 is electrically connected to the data signal terminal Vdata, and a second electrode of the second transistor T4 is electrically connected to the first leakage current compensation point A between the dual gates of the first dual gate transistor.

Figure 5B:
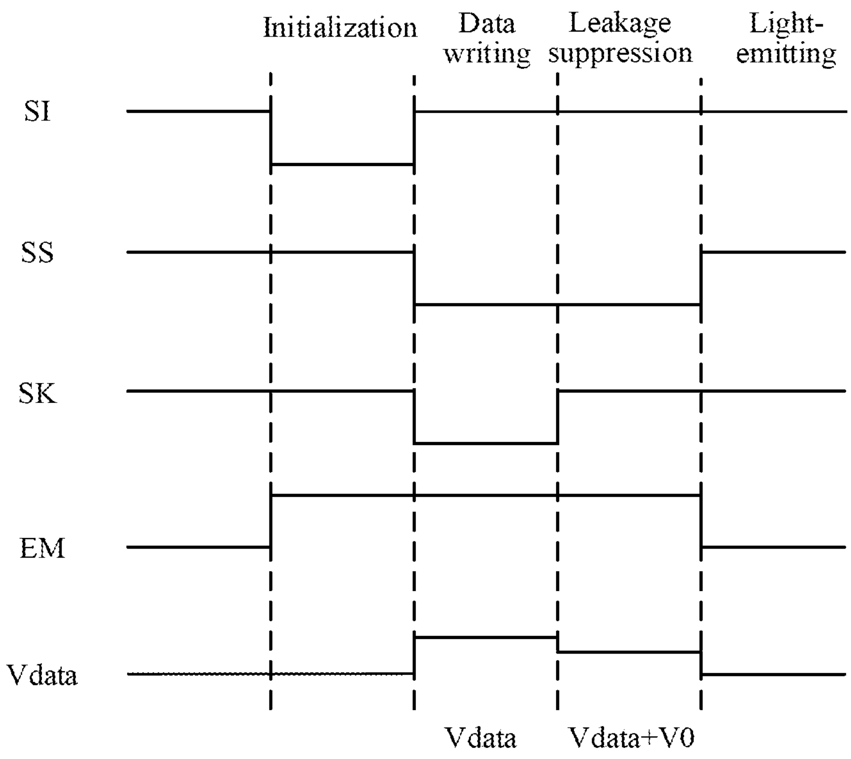
FIG. 5B to FIG. 5C show a signal timing diagram of the pixel circuit in FIG. 5A.

FIG. 5B shows a signal timing diagram of the pixel circuit in FIG. 5A. As shown in FIG. 5B, a display process of each frame of the image includes an initialization phase, a data writing phase, a leakage current compensation phase and a light-emitting phase.

In the embodiment of the present disclosure, the initialization phase, the data writing phase and the light emitting phase are similar to the initialization phase, the data writing phase and the light emitting phase in FIG. 2B, respectively. For simplicity, the present disclosure will not be repeated.

As shown in FIG. 5B, in the leakage compensation phase, a second data signal is input from the data signal terminal Vdata, and a potential amplitude of the second data signal is Vdata+V0. The third scanning signal SS is at low level, which is an effective level, and the first scanning signal SK is at high level. Under control of the third scanning signal SS, the second transistor T4 is turned on. The potential of the first leakage current compensation point A increases until the potential of the first leakage current compensation point A increases to Vdata+V0.

After the leakage current compensation phase, the potential $V_A$ of the first leakage current compensation point A is Vdata+V0. In the light-emitting phase, $V_A$=Vdata+V0, $V_{N1}$=Vdata+Vth, $V_A \approx V_{N1}$, so that the VSD of the transistor T1-2 in the first dual gate transistor is VSD≈0. At this time, the leakage current flowing through the transistor T1-2 is extremely small, and the gate potential of the driving transistor T3 may remain stable, thereby reducing the possibility of flicker and improving the display quality.

Figure 5C:
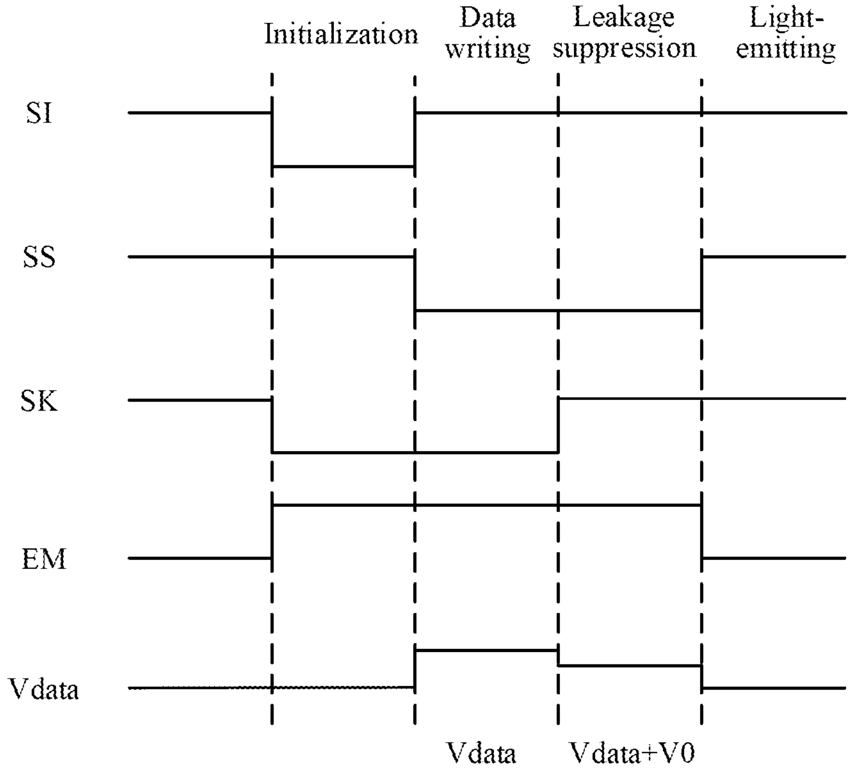

FIG. 5C shows another signal timing diagram of the pixel circuit in FIG. 5A. As shown in FIG. 5C, a display process of each frame of the image includes an initialization phase, a data writing phase, a leakage current compensation phase and a light-emitting phase. FIG. 5C shows timing waveforms of each signal in each phase.

In the embodiment of the present disclosure, the data writing phase, the leakage current compensation phase and the light-emitting phase are similar to the initial data writing phase, the leakage current compensation phase and the light-emitting phase in FIG. 5B, respectively. For simplicity, the present disclosure will not be repeated.

In the initialization phase, the low levels of the first scanning signal SK and the second scanning signal SI are effective levels. Under control of the first scanning signal SK, the first transistor T8 is turned on. Under control of the second scanning signal SI, the first dual gate transistor T1 is turned on. An initialization signal is input from the predetermined initialization terminal VINT. A voltage of the initialization signal VINT is written into the second node N2 along an initialization path from the predetermined initialization terminal VINT to the second node N2 via the transistor T1-1 and the first transistor T8, thereby initializing a voltage of a source of the driving transistor T3 as VINT. An initialization process of the gate of the driving transistor T3 and an anode of the light-emitting element EL in the initialization phase is the same as the corresponding embodiment in FIG. 2C, which will not be repeated in the present disclosure.

In the initialization phase, a voltage $V_g$ of a gate of the driving transistor T3 and a voltage $V_S$ of a source of the driving transistor T3 are initialized, so that the VGS=0, the driving transistor T3 is in an On-Bias state, thereby improving the hysteresis of DTFT and improving short-term disability.

Figure 6A:
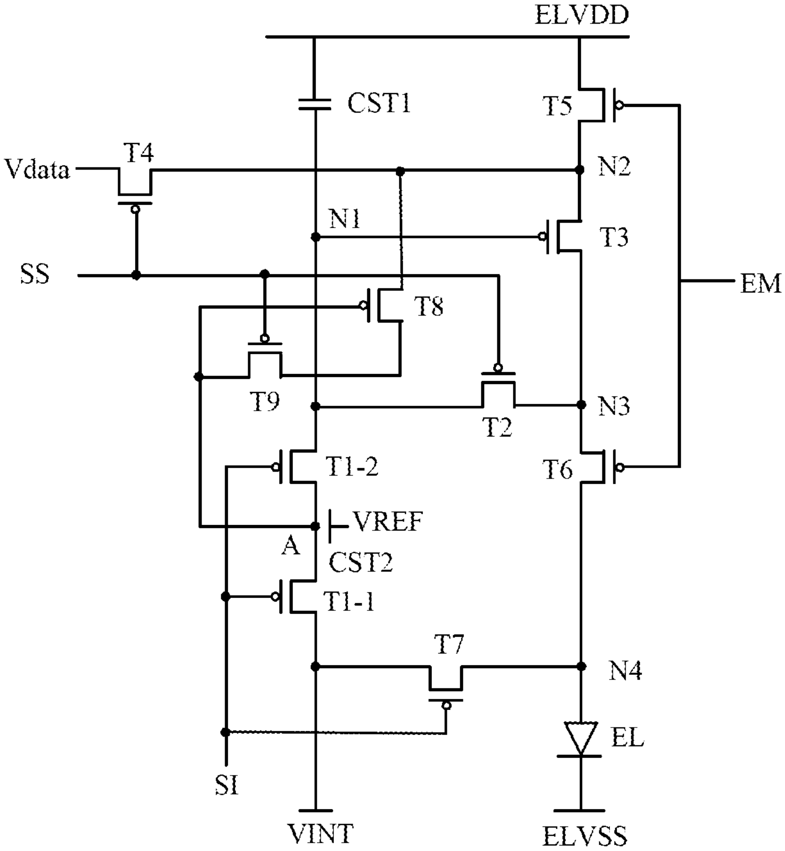
FIG. 6A shows a schematic diagram of a structure of another pixel circuit according to an embodiment of the present disclosure.

FIG. 6A shows a schematic diagram of a structure of a pixel circuit according to another embodiment of the present disclosure. As shown in FIG. 6A, the pixel circuit includes transistors T1~T9, a light-emitting element EL and storage capacitors CST1 and CST2. The scanning signal terminal includes a second scanning signal terminal SI and a third scanning signal terminal. The leakage current compensation point includes a first leakage current compensation point A.

In the embodiment of the present disclosure, the transistors T1 to T7, the storage capacitor CST1, the capacitor CST2, the scanning signal terminals (the second scanning signal terminal SI and the third scanning signal terminal SS), the predetermined initial voltage terminal VINT, the control signal terminal EM, the first power supply ELVDD and the second power supply ELVSS have similar functions and connection relationships with the transistors T1 to T7, the storage capacitor CST1, the capacitor CST2, the scanning signal terminals (the second scanning signal terminal SI and the third scanning signal terminal SS), the predetermined initial voltage terminal VINT, the control signal terminal EM, the first power supply ELVDD and the second power supply ELVSS in FIG. 2A, respectively. For simplicity, the present disclosure will not be repeated.

As shown in FIG. 6A, a gate of the first transistor T8 is electrically connected to the first leakage current compensation point A between the dual gates of the first dual gate transistor T1, a first electrode of the first transistor T8 is electrically connected to a second electrode of the second transistor T4, and a second electrode of the first transistor T8 is electrically connected to a first electrode of the third transistor T9. A gate of the third transistor T9 is electrically connected to the third scanning signal terminal SS, and a second electrode of the third transistor T9 is connected to the first leakage current compensation point A between the dual gates of the first dual gate transistor T1.

Figure 6B:
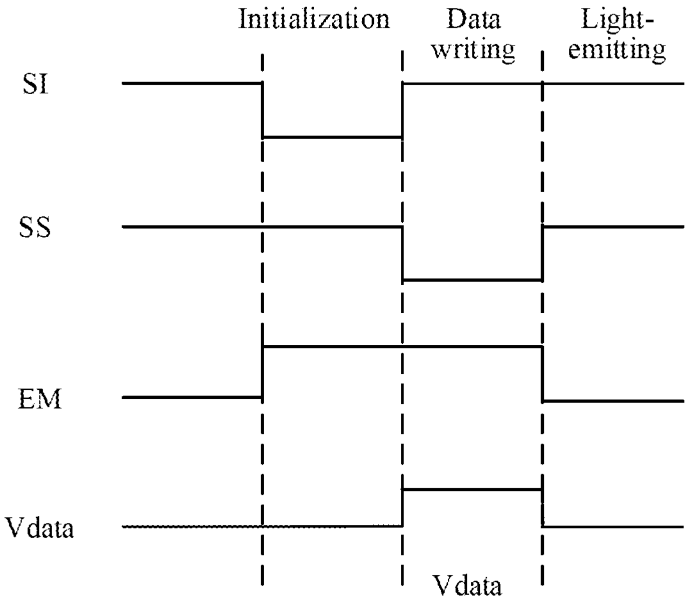
FIG. 6B shows a signal timing diagram of the pixel circuit in FIG. 6A.

FIG. 6B shows a signal timing diagram of the pixel circuit in FIG. 6A. As shown in FIG. 6B, a display process of each frame of the image includes an initialization phase, a data writing phase and a lighting phase. FIG. 6B shows timing waveforms of each signal in each phase.

In the embodiment of the present disclosure, the light-emitting phase is similar to the light-emitting phase in FIG. 2B, respectively. For simplicity, the present disclosure will not be repeated. A process of charging the first leakage current compensation point A in the embodiment of the present disclosure is completed in the data writing phase. Therefore, it may be considered that the data writing phase of the embodiment of the present disclosure includes the leakage current compensation phase.

In the initialization phase, the second scanning signal SI is at low level, which is an effective level. Under control of the second scanning signal SI, the first dual gate transistor T1 is turned on. An initialization signal is written into the gate of the first transistor T8 along an initialization path from the predetermined initial voltage terminal VINT to the gate of the first transistor T8 via the transistor T1-1, thereby initializing the voltage of the gate of the first transistor T8 as VINT.

In the data writing phase, the third scanning signal SS is at low level which is an effective level. Under control of the third scanning signal SS, the third transistor T9 is turned on. Since the voltage of the gate of the first transistor T8 and the voltage of the gate of the driving transistor T3 are initialized as VINT in the initialization phase, the first transistor T8 and the driving transistor T3 are turned on. It should be noted that the first transistor T8 and the driving transistor T3 have a similar threshold voltage Vth. A voltage amplitude of the data signal input from the data signal terminal Vdata is Vdata. The data signal is written into the first leakage current compensation point A along a data writing path from the data signal terminal Vdata to the first leakage current compensation point A via the second transistor T4, the first transistor T8, and the third transistor T9. At this time, the potential of the first leakage current compensation point A increases until the potential of the first leakage current compensation point A increases to Vdata+Vth.

After the leakage current compensation phase, the potential $V_A$ of the first leakage current compensation point A is Vdata+Vth, and the voltage $V_{N1}$ of the first node N1 is Vdata+Vth. In the light-emitting phase, $V_A=V_{N1}=$Vdata+Vth, so that the VSD of the transistor T1-2 in the first dual gate transistor is VSD≈0. At this time, the leakage current flowing through the transistor T1-2 is extremely small, and the gate potential of driving transistor T3 may remain stable, thereby reducing the possibility of flicker and improving display quality.

It should be noted that the transistor T2 may be a dual gate transistor or a single gate transistor. The dual gate transistor may alleviate the problem of leakage current of the gate of the driving transistor to a certain extent.

Figure 7A:
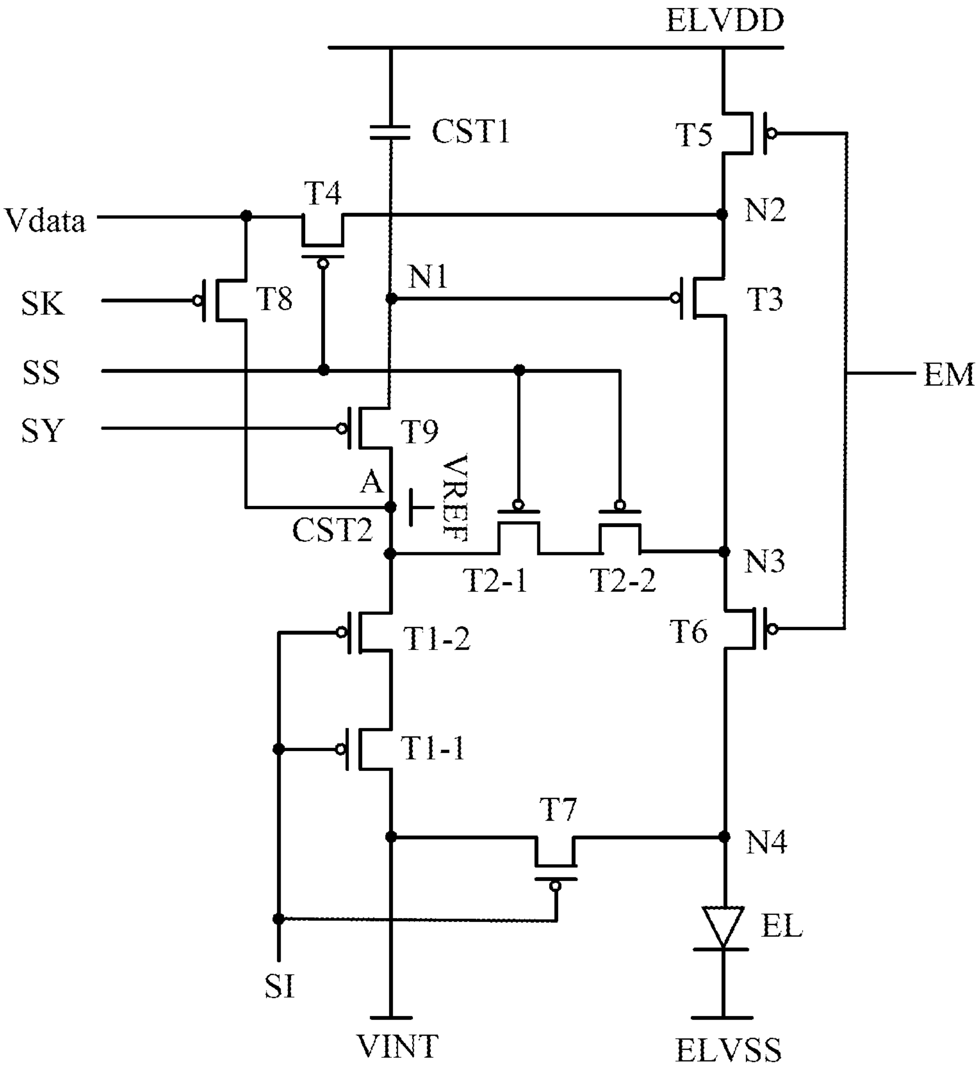
FIG. 7A shows a schematic diagram of a structure of a pixel circuit according to an embodiment of the present disclosure.

FIG. 7A shows a schematic diagram of a structure of a pixel circuit according to another embodiment of the present disclosure. As shown in FIG. 7A, the pixel circuit includes transistors T1~T9, a light-emitting element EL, a storage capacitor CST1 and a capacitor CST2. The scanning signal terminal includes a first scanning signal terminal SK, a second scanning signal terminal SI, a third scanning signal terminal SS and a fourth scanning signal terminal SY. The leakage current compensation point includes a first leakage current compensation point A.

In the embodiment of the present disclosure, the transistors T1 to T7, the storage capacitor CST1, the capacitor CST2, the scanning signal terminals (the first scanning signal terminal SK, the second scanning signal terminal SI, the third scanning signal terminal SS and the fourth scanning signal terminal SY), the predetermined initial voltage terminal VINT, the control signal terminal EM, the first power supply ELVDD and the second power supply ELVSS have similar functions and connection relationships the transistors T1 to T7, the storage capacitor CST1, the capacitor CST2, the scanning signal terminals (the first scanning signal terminal SK, the second scanning signal terminal SI, the third scanning signal terminal SS and the fourth scanning signal terminal SY), the predetermined initial voltage terminal VINT, the control signal terminal EM, the first power supply ELVDD and the second power supply ELVSS in FIG. 2A, respectively. For simplicity, the present disclosure will not be repeated.

As shown in FIG. 7A, a gate of the first transistor T8 is electrically connected to the first scanning signal terminal SK, a first electrode of the first transistor T8 is electrically connected to the data signal terminal Vdata, and a second electrode of the first transistor T8 is electrically connected to the first leakage current compensation point A located between the third transistor T9 and the second dual gate transistor T2. The first leakage current compensation point A requires to be located between the third transistor T9 and the first dual gate transistor T1. A gate of the third transistor T9 is electrically connected to the fourth scanning signal terminal SY, a first electrode of the third transistor T9 is electrically connected to the first leakage current compensation point A, and a second electrode of the third transistor T9 is electrically connected to the source of the driving transistor T3 at the node N1.

Figure 7B:
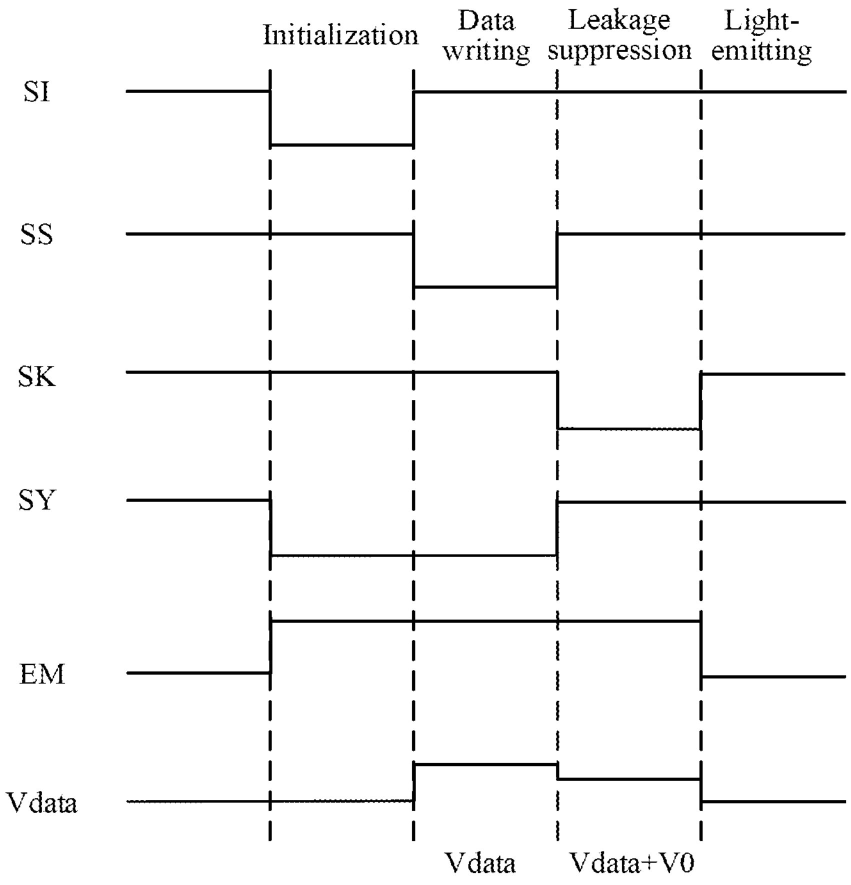
FIG. 7B shows a signal timing diagram of the pixel circuit in FIG. 7A.

FIG. 7B shows a signal timing diagram of the pixel circuit in FIG. 7A. As shown in FIG. 7B, a display process of each frame of the image includes an initialization phase, a data writing phase, a leakage current compensation phase and a light-emitting phase. FIG. 7B shows timing waveforms of each signal in each phase.

In the embodiment of the present disclosure, the leakage current compensation phase and the light-emitting phase are similar to the leakage current compensation phase and the light-emitting phase in FIG. 2B, respectively. For simplicity, the present disclosure will not be repeated.

In the initialization phase, the low levels of the second scanning signal SI and the fourth scanning signal SY are effective levels. Under control of the second scanning signal SI, the first dual gate transistor T1 is turned on. Under control of the fourth scanning signal SY, the third transistor T9 is turned on. The voltage of the initialization signal VINT is written into the first node N1 along a path from the predetermined initial voltage terminal VINT to the first node N1 via the first dual gate transistor T1 and the third transistor T9.

In the data writing phase, the low levels of the third scanning signal SS and the fourth scanning signal SY are effective levels. Under control of the third scanning signal SS, the second transistor T4 and the second dual gate transistor T2 are turned on. Under control of the fourth scanning signal SY, the third transistor T9 is turned on. The first data signal is input from the data signal terminal Vdata, and the potential amplitude of the first data signal is Vdata. The first data signal is written into the first node N1 along a path from the data signal terminal Vdata to the first node N1 via the second transistor T4, the driving transistor T3, the second dual gate transistor T2, and the third transistor T9. When the potential of the first node N1 increases to Vdata+Vth, the driving transistor T3 is turned off.

After the leakage current compensation phase, the potential $V_A$ of the first leakage current compensation point A is Vdata+V0. In the light-emitting phase, $V_A$==Vdata+V0, $V_{N1}$=Vdata+Vth, $V_A \approx V_{N1}$, so that the VSD of the transistor T1-2 in the first dual gate transistor is VSD≈0. At this time, the leakage current flowing through the transistor T1-2 is extremely small, and the gate potential of the driving transistor T3 may remain stable, thereby reducing the possibility of flicker and improving the display quality.

FIG. 8A to FIG. 8D are cross-sectional views of the first transistor T1 and the first dual gate transistor T1 in the pixel circuit shown in FIG. 4A.

As shown in FIG. 8A to FIG. 8D, a barrier layer 820, a PI base 810, an inorganic layer 830 and insulation layers 840-860 are sequentially formed on the PI base 810. After the first transistor T8 is turned on, a voltage on a signal line SD1 enters through the source of the first transistor T8. The drain of the first transistor T8 is electrically connected to the first leakage current compensation point A between the dual gates of the first dual gate transistor T1 through a signal line SD2.

Figure 8A:
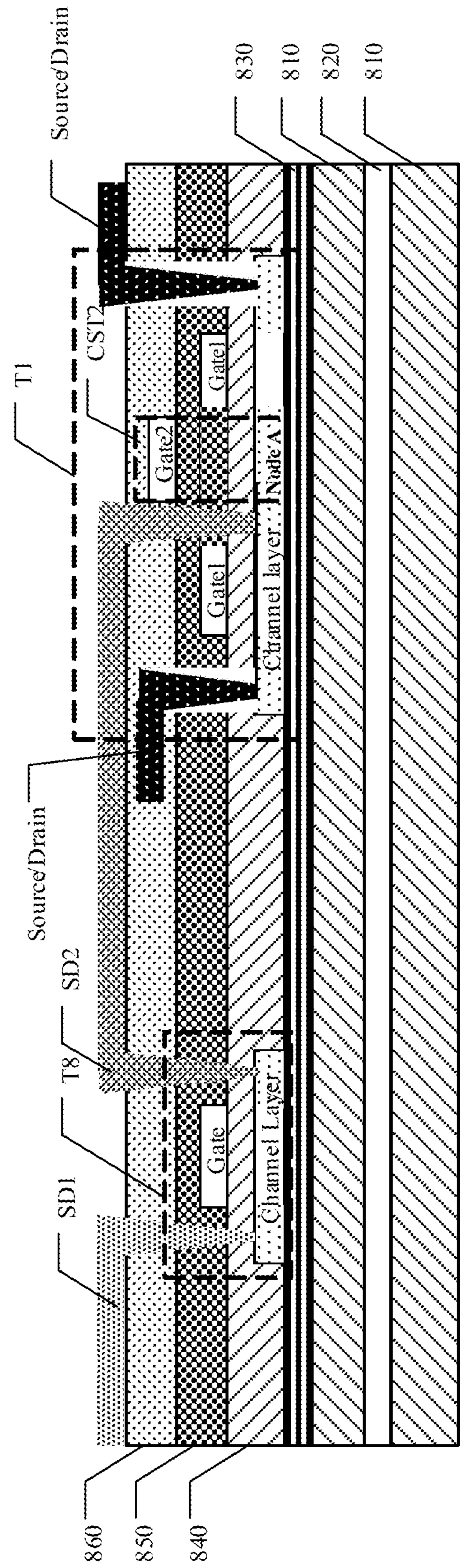
FIG. 8A to FIG. 8D show cross-sectional views of a first transistor T8 and a first dual gate transistor T1 in a pixel circuit according to an embodiment of the present disclosure.
Figure 8B:
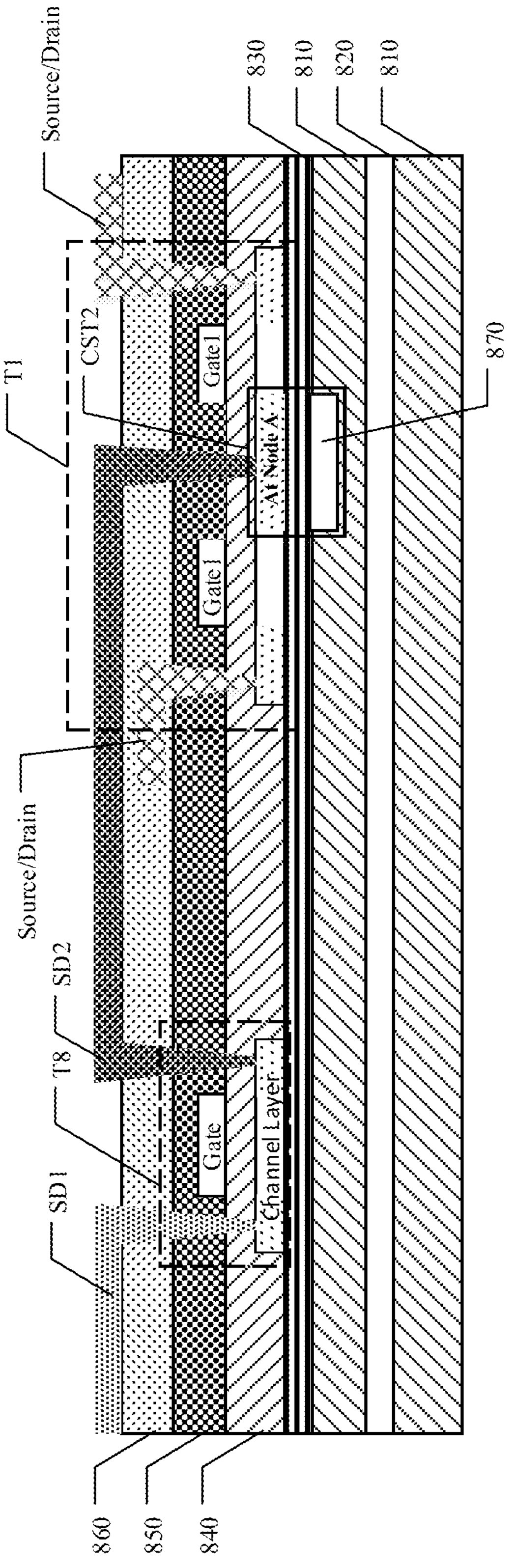
Figure 8C:
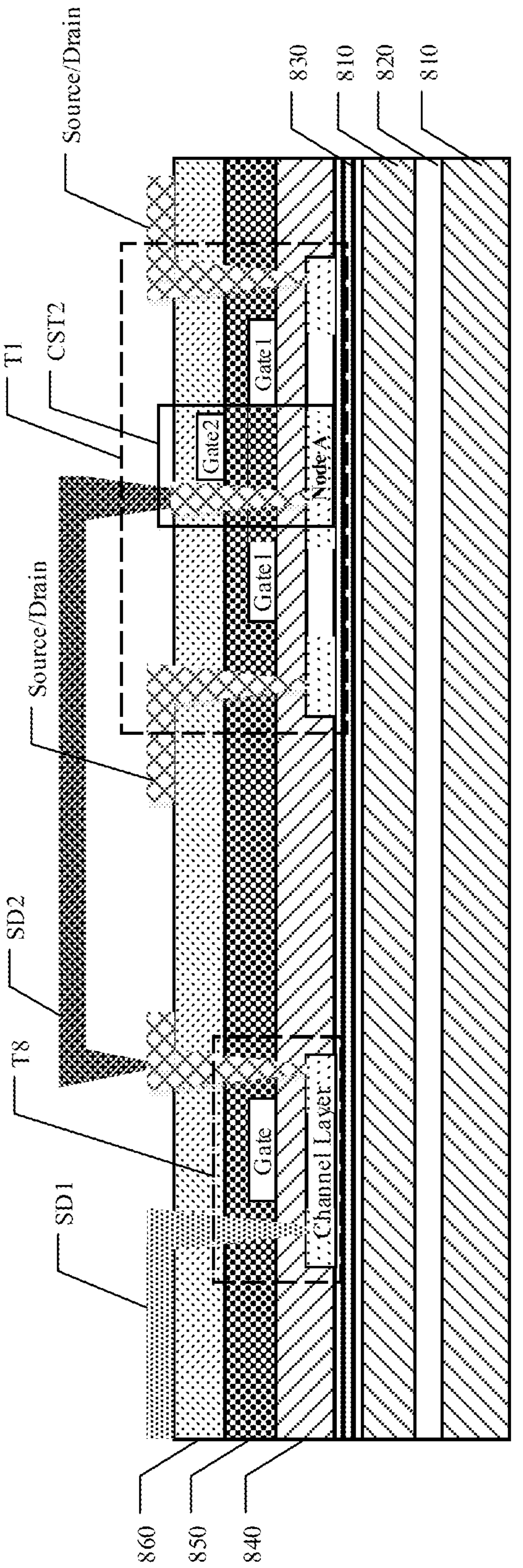
Figure 8D:
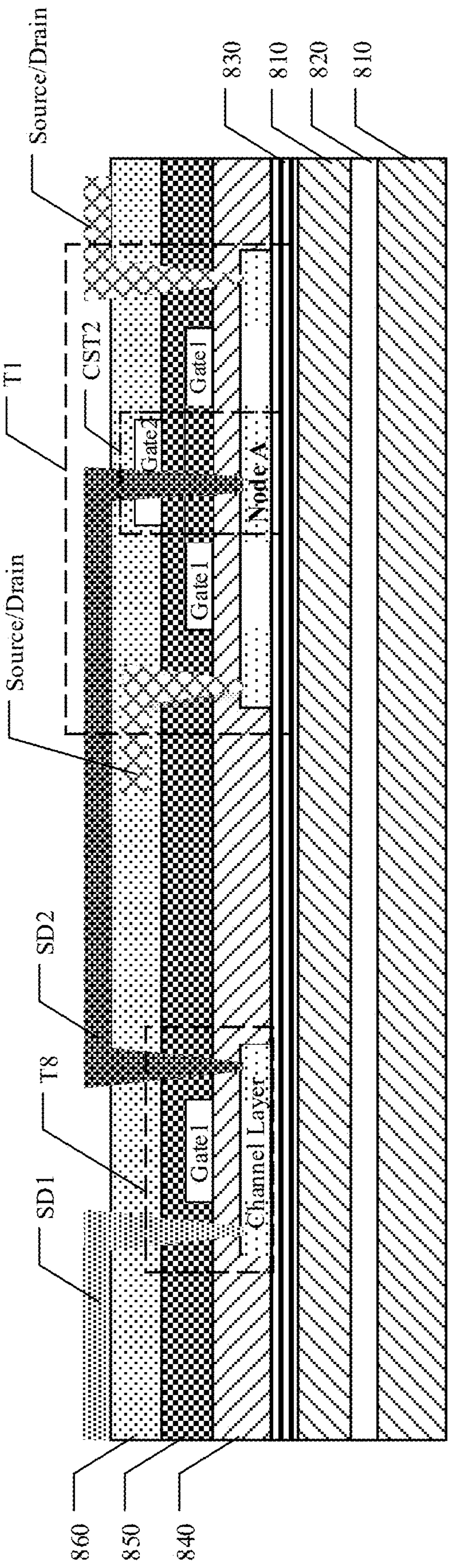

At the first leakage current compensation point A, a storage capacitor CST2 is provided. The first leakage current compensation point A may be considered as an electrode plate of the storage capacitor CST2. A gate Gate2 of the first dual gate transistor T1 or a metal layer 870 below a channel layer (as shown in FIG. 8B) serves as another electrode plate for the storage capacitor CST2. The gate Gate2 of the first dual gate transistor T1 or the metal layer 840 below the channel layer may be electrically connected to any power supply providing a stable potential VREF through the signal line SD1.

Figure 9:
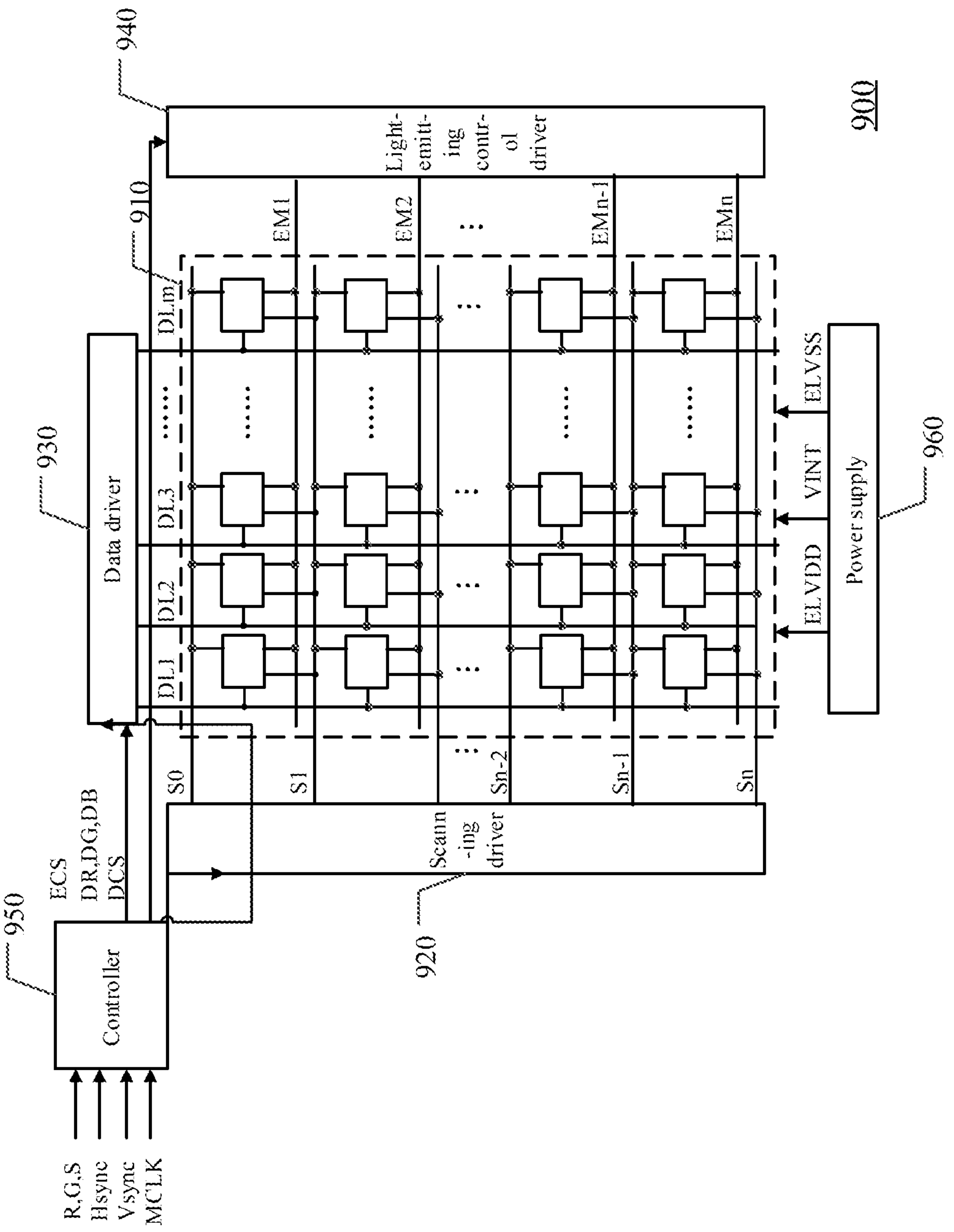
FIG. 9 shows a schematic diagram of a structure of a display device according to an embodiment of the present disclosure.

The present disclosure also provides an embodiment of a display device. FIG. 9 shows a schematic diagram of a structure of a display device according to an embodiment of the present disclosure. As shown in FIG. 9, a display device 900 according to the embodiment of the present disclosure may include a display panel 910, a scanning driver 920, a data driver 930, a light-emitting control driver 940, a controller 950 and a power supply unit 960 that provides an external voltage to the display device 900.

The display panel 910 includes scanning signal lines S0~Sn, data signal lines DL1~DLm, control signal lines EM1~EMn, an initialization signal line VINT and a plurality of pixel units. The scanning signal lines S0~Sn are configured to provide scanning signals. Each scanning signal line Sn includes a plurality of scanning signal lines. The plurality of scanning signal lines are respectively implemented to provide a first scanning signal terminal SK, a second scanning signal terminal SI, a third scanning signal terminal SS, and a fourth scanning signal terminal SY of the above embodiment. The data signal lines DL1~DLm are configured to provide data signals. The initialization signal line VINT is configured to provide an initialization signal. The control signal lines EM1~EMn are configured to provide light-emitting control signals. The pixel unit includes any pixel circuit provided in the corresponding embodiments in FIG. 1, FIG. 2A, FIG. 3A, FIG. 4A, FIG. 5A, FIG. 6A, and FIG. 7A. The pixel circuit includes a pixel driving circuit and a light-emitting element. The pixel driving circuit includes any pixel driving circuit provided in the above embodiments. A first terminal of the light-emitting element is connected to the pixel driving circuit, and a second terminal of the light-emitting element is connected to the second power supply ELVSS, where m and n are positive integers.

The plurality of pixel units are supplied with external voltages, such as a first power supply voltage ELVDD, a second power supply voltage ELVSS and an initialization voltage VINT from a power supply unit 960. The voltage level of the first power supply voltage ELVDD may be higher than the voltage level of the second power supply voltage ELVSS.

The display panel 910 includes a plurality of pixel units arranged in an approximate matrix form. The plurality of scanning lines S0~Sn are substantially extended as rows in a first direction, so that the plurality of scanning lines S0~Sn are parallel to each other, and the plurality of data lines are substantially extended as columns in a second direction intersecting with the first direction, so that the plurality of data lines are parallel to each other in the arrangement of pixels. However, the embodiments of the present disclosure are not limited to this.

The pixel units are connected to the plurality of scanning lines S0 to Sn for transmitting scanning signals to the display panel 910, respectively. Each pixel unit is connected to a scanning line corresponding to a corresponding pixel row, and each pixel is also connected to a scanning line of its previous row. However, the embodiment of the present disclosure is not limited to this.

In addition, each pixel in the plurality of pixel units is connected to one data line of the plurality of data lines DL1 to DLm that transmits the data signals to the display panel 910, and one light-emitting control line of the plurality of light-emitting control signal lines EM1 to EMn that transmits the light-emitting control signals to the display panel 910.

The scanning driver 920 generates a plurality of corresponding scanning signals and transmits the plurality of corresponding scanning signals to the pixel unit through the plurality of scanning lines S0~Sn. The data driver 930 transmits data signals to each pixel through the plurality of data lines DL1~DLm. The light-emitting control driver 940 generates light-emitting control signals and transmits them to each pixel unit through the plurality of light-emitting control signal lines EM1~EMn.

The controller 950 converts (or alters) a plurality of video signals R, G, and B transmitted from external sources into a plurality of image data signals DR, DG, and DB, and transmits the plurality of image data signals DR, DG, and DB to the data driver 930. In addition, the controller 950 receives a vertical synchronization signal Vsync, a horizontal synchronization signal Hsync and a clock signal MCLK to generate control signals, thereby controlling the driving of the scanning driver 920, the data driver 930 and the light-emitting control driver 940. That is to say, the controller 950 generates and transmits a scanning driving control signal SCS for controlling the scanning driver 20, a data driving control signal DCS for controlling the data driver 930, and a light-emitting control signal ECS for controlling the light-emitting control driver 940.

According to the data signals transmitted through the plurality of data lines DL1~DLm, a driving current is provided to the OLED in each pixel, so that each of the plurality of pixels emit light with a brightness (e.g. a predetermined brightness).

The display device 900 according to the embodiment of the present disclosure may be any product or component with display function, such as electronic paper, mobile phone, tablet, TV, monitor, laptop, digital photo frame, navigation device, etc.

Figure 10:
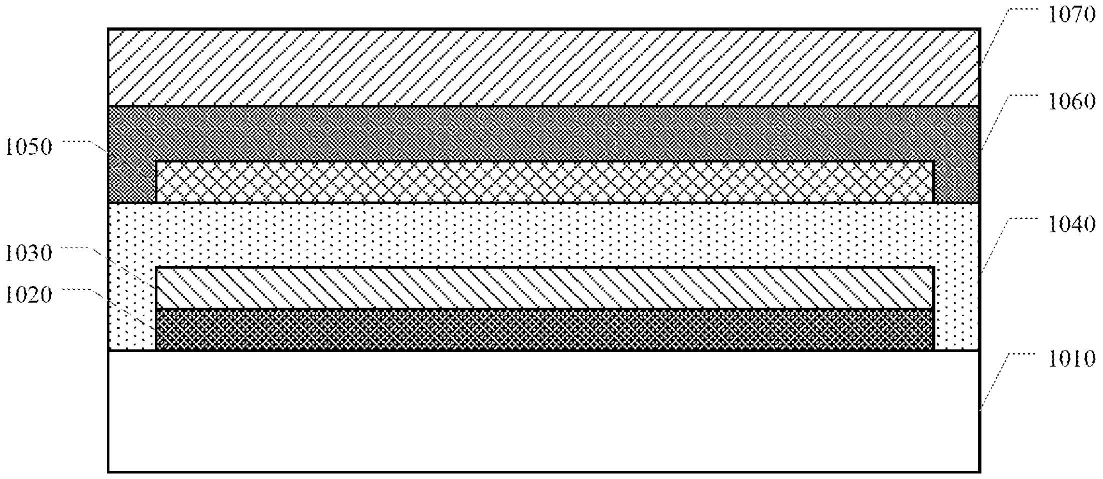
FIG. 10 shows a schematic diagram of a stacked structure of a display panel according to an embodiment of the present disclosure.

FIG. 10 shows a schematic diagram of a stacked structure of a display panel according to an embodiment of the present disclosure. As shown in FIG. 10, a thin film transistor array TFT1020, an emitting layer EML1030, an encapsulation film layer TFE1040, a touch electrode layer Touch1050, a polarization layer 1060 and a cover plate 1070 are sequentially formed on a LTPS substrate 1010. The polarization layer may also be a filter layer.

Figure 11:
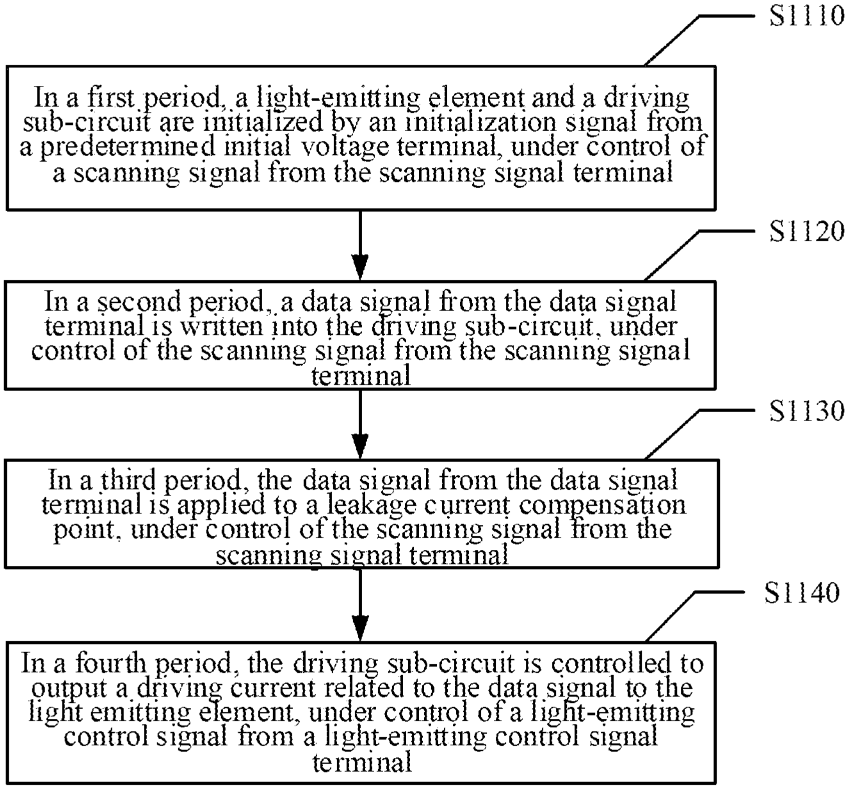
FIG. 11 shows a flowchart of a method of driving a pixel circuit of an embodiment of the present disclosure.

According to the embodiment of the present disclosure, a method for driving a pixel driving circuit is also provided. FIG. 11 shows a flowchart of a method for driving a pixel driving circuit according to an embodiment of the present disclosure. As shown in FIG. 11, the method for driving the pixel driving circuit according to the embodiment of the present disclosure may include the following steps. It should be noted that serial numbers of each step in the following methods are only used as a representation for the purpose of description, and should not be regarded as representing the execution order of each step. Unless explicitly stated, this method does not require to be performed entirely in the order shown.

In step S1110, in a first period, a light-emitting element and a driving sub-circuit are initialized by an initialization signal from a predetermined initial voltage terminal, under control of a scanning signal from the scanning signal terminal.

In step S1120, in a second period, a data signal from the data signal terminal is written into the driving sub-circuit, under control of the scanning signal from the scanning signal terminal.

In step S1130, in a third period, the data signal from the data signal terminal is applied to a leakage current compensation point, under control of the scanning signal from the scanning signal terminal.

In step S1140, in a fourth period, the driving sub-circuit is controlled to output a driving current related to the data signal to the light emitting element, under control of a light-emitting control signal from a light-emitting control signal terminal.

In the fourth period, a voltage of a control electrode of the driving sub-circuit is compensated by a voltage of the leakage current compensation point.

According to the embodiment of the present disclosure, for example, in the first period, a second scanning signal SI is at an effective level, and a first dual gate transistor T1 is turned on. In the second period, each of a first scanning signal SK and a third scanning signal SS is at effective level, a first transistor T8 and a second transistor T4 are turned on, and a first data signal from the data signal terminal is written into a driving sub-circuit through the first transistor T8 and the second transistor T4. In the third period, the first scanning signal is at effective level, the first transistor T8 is turned on, and a second data signal from the data signal terminal is applied to a first leakage current compensation point through the first transistor T8.

For example, in the third period, a fourth scanning signal SY is at an effective level, so that a third transistor T9 and/or a fourth transistor T10 are turned on. Accordingly, the second data signal from the data signal terminal is applied to a second leakage current compensation point through turning on the third transistor T9, and/or the second data signal from the data signal terminal is applied to the first leakage current compensation point through turning on the fourth transistor T10.

According to the embodiment of the present disclosure, for example, in the third period, a third scanning signal SS is at an effective level, a second transistor T4 is turned on, and a second data signal from the data signal terminal is applied to a first leakage current compensation point through the second transistor T4.

For example, in the first period, a first scanning signal SK is at an effective level, and a first transistor T8 is turned on, and an input terminal of the driving sub-circuit is initialized by using an initialization signal through the first transistor T8.

According to the embodiment of the present disclosure, for example, in the second period and the third period, a third scanning signal SS is at an effective level, so that a first transistor T8, a second transistor T4, and a third transistor T9 are turned on. Accordingly, a first data signal from the data signal terminal is written into an input terminal of the driving sub-circuit through the second transistor T4, and the first data signal from the data signal terminal is applied to a first leakage current compensation point A through the first transistor T8 and the third transistor T9.

According to the embodiment of the present disclosure, for example, in the second time period, a third scanning signal SS and a fourth scanning signal SN are at effective level, so that a second dual gate transistor T2, a second transistor T4, and a third transistor T9 are turned on. Accordingly, a first data signal from the data signal terminal is written into the driving sub-circuit through the second dual gate transistor T2, the second transistor T4 and the third transistor T9.

According to the embodiment of the present disclosures, for example, an amplitude of the second data signal is a sum of an amplitude of the first data signal and an amplitude of an additional signal, and the amplitude of the additional signal is related to a threshold voltage of a driving transistor.

It should be noted that in the above description, the technical solution of the embodiments of the present disclosure is shown only by example, but it does not mean that the embodiments of the present disclosure is limited to the above steps and structures. In possible cases, adjustments and trade-offs may be made to the steps and structure as required. Therefore, certain steps and units are not essential elements for implementing the entire inventive concept of the embodiments of the present disclosure.

Thus, the present disclosure has been described in conjunction with preferred embodiments. It should be understood that those of skill in the art may make various other changes, replacements and additions without departing from the spirit and scope of the embodiments of the present disclosure. Therefore, the scope of the embodiments of the present disclosure is not limited to the specific embodiments mentioned above, but should be limited by the accompanying claims.

What is claimed is:

1. A pixel driving circuit configured to drive a light-emitting element to emit light, the pixel driving circuit comprising:

a driving sub-circuit connected to the light-emitting element;

a data writing sub-circuit electrically connected to a data signal terminal, a scanning signal terminal and the driving sub-circuit, and configured to write a data signal from the data signal terminal into the driving sub-circuit and apply the data signal from the data signal terminal to a leakage current compensation point, under control of a scanning signal from the scanning signal terminal; and a light-emitting control sub-circuit electrically connected to the driving sub-pixel, a light-emitting control signal terminal and the light-emitting element, and configured to control the driving sub-circuit to output a driving current related to the data signal to the light-emitting element under control of a light-emitting control signal from the light-emitting control signal terminal, wherein a voltage of a control electrode of the driving sub-circuit is compensated by a voltage of the leakage current compensation point in a process of emitting light by the light-emitting element, wherein the data writing sub-circuit comprises a first transistor (T8), a second transistor (T4) and a first dual gate transistor (T1-1 T1-2), the scanning signal terminal comprises a first scanning signal terminal (SK) and a third scanning signal terminal (SS), and the leakage current compensation point comprises a first leakage current compensation point (A), wherein a control electrode of the first transistor (T8) is electrically connected to the first scanning signal terminal (SK), a first electrode of the first transistor (T8) is electrically connected to a second electrode of the second transistor (T4), and a second electrode of the first transistor (T8) is electrically connected to an input terminal of the driving sub-circuit, and wherein a control electrode of the second transistor (T4) is electrically connected to the third scanning signal terminal (SS), a first electrode of the second transistor (T4) is electrically connected to the data signal terminal (Vdata), and the second electrode of the second transistor (T4) is electrically connected to the first leakage current compensation point (A) between dual gates of the first dual gate transistor.

2. The pixel driving circuit of claim 1, wherein the data writing sub-circuit further comprises a fifth transistor (T7), and wherein a control electrode of the fifth transistor (T7) is electrically connected to a second scanning signal terminal (SI), a first electrode of the fifth transistor (T7) is electrically connected to a predetermined initial voltage terminal (VINT), and a second electrode of the fifth transistor (T7) is electrically connected to an anode of the light-emitting element.

3. The pixel driving circuit of claim 1, wherein the light-emitting control sub-circuit comprises a sixth transistor (T5) and a seventh transistor (T6), wherein a control electrode of the sixth transistor (T5) is electrically connected to the light-emitting control signal terminal (EM), a first electrode of the sixth transistor (T5) is electrically connected to a first power supply (ELVDD), and a second electrode of the sixth transistor (T5) is electrically connected to an input terminal of the driving sub-circuit, and wherein a control electrode of the seventh transistor (T6) is electrically connected to the light-emitting control signal terminal (EM), a first electrode of the seventh transistor (T6) is electrically connected to an output terminal of the driving circuit, and a second electrode of the seventh transistor (T6) is electrically connected to the light-emitting element.

4. The pixel driving circuit of claim 1, wherein the driving sub-circuit comprises a driving transistor (T3) and a storage capacitor (C1), wherein a control electrode of the driving transistor (T3) is electrically connected to the data writing sub-circuit, a source of the driving transistor (T3) is electrically connected to the data writing sub-circuit, and a drain of the driving transistor (T3) is electrically connected to the light-emitting control sub-circuit, and wherein a first terminal of the storage capacitor is electrically connected to the control electrode of the driving transistor, and a second terminal of the storage capacitor is electrically connected to a first power supply (ELVDD).

5. The pixel driving circuit of claim 1, wherein when the driving current drives the light-emitting element to emit light, the driving current is K(Vdata-ELVDD) 2, where K is a constant related to a driving transistor, Vdata is the data signal, and ELVDD is a first power supply voltage.

6. A display panel, comprising:

a scanning signal line configured to provide a scanning signal;

a data signal line configured to provide a data signal;

an initialization signal line configured to provide an initialization signal;

a control signal line configured to provide a light-emitting control signal;

a pixel driving circuit of claim 1; and a light-emitting element, wherein a first terminal of the light-emitting element is connected to the pixel driving circuit, and a second terminal of the light-emitting element is connected to a second power supply.

7. A display device comprising a display panel of claim 6.

8. A pixel driving circuit configured to drive a light-emitting element to emit light, the pixel driving circuit comprising:

a driving sub-circuit connected to the light-emitting element;

a data writing sub-circuit electrically connected to a data signal terminal, a scanning signal terminal and the driving sub-circuit, and configured to write a data signal from the data signal terminal into the driving sub-circuit and apply the data signal from the data signal terminal to a leakage current compensation point, under control of a scanning signal from the scanning signal terminal; and a light-emitting control sub-circuit electrically connected to the driving sub-pixel, a light-emitting control signal terminal and the light-emitting element, and configured to control the driving sub-circuit to output a driving current related to the data signal to the light-emitting element under control of a light-emitting control signal from the light-emitting control signal terminal, wherein a voltage of a control electrode of the driving sub-circuit is compensated by a voltage of the leakage current compensation point in a process of emitting light by the light-emitting element, wherein the data writing sub-circuit comprises a first transistor (T8), a second transistor (T4), a third transistor (T9) and a first dual gate transistor (T1-1 T1-2), the leakage current compensation point comprises a first leakage current compensation point (A), and the scanning signal terminal comprises a third scanning signal terminal (SS), wherein a control electrode of the first transistor (T8) is electrically connected to the first leakage current compensation point (A) between dual gates of the first dual gate transistor, a first electrode of the first transistor (T8) is electrically connected to a second electrode of the second transistor (T4), and a second electrode of the first transistor (T8) is electrically connected to a first electrode of the third transistor (T9), wherein a control electrode of the second transistor (T4) is electrically connected to the third scanning signal terminal (SS), a first electrode of the second transistor (T4) is electrically connected to the data signal terminal, and the second electrode of the second transistor (T4) is electrically connected to an input terminal of the driving sub-circuit, and wherein a control electrode of the third transistor (T9) is electrically connected to the third scanning signal terminal (SS), and a second electrode of the third transistor (T9) is electrically connected to the first leakage current compensation point (A).

9. The pixel driving circuit of claim 8, wherein the data writing sub-circuit further comprises a fifth transistor (T7), and wherein a control electrode of the fifth transistor (T7) is electrically connected to a second scanning signal terminal (SI), a first electrode of the fifth transistor (T7) is electrically connected to a predetermined initial voltage terminal (VINT), and a second electrode of the fifth transistor (T7) is electrically connected to an anode of the light-emitting element.

10. The pixel driving circuit of claim 8, wherein the light-emitting control sub-circuit comprises a sixth transistor (T5) and a seventh transistor (T6), wherein a control electrode of the sixth transistor (T5) is electrically connected to the light-emitting control signal terminal (EM), a first electrode of the sixth transistor (T5) is electrically connected to a first power supply (ELVDD), and a second electrode of the sixth transistor (T5) is electrically connected to an input terminal of the driving sub-circuit, and wherein a control electrode of the seventh transistor (T6) is electrically connected to the light-emitting control signal terminal (EM), a first electrode of the seventh transistor (T6) is electrically connected to an output terminal of the driving circuit, and a second electrode of the seventh transistor (T6) is electrically connected to the light-emitting element.

11. The pixel driving circuit of claim 8, wherein the driving sub-circuit comprises a driving transistor (T3) and a storage capacitor (C1), wherein a control electrode of the driving transistor (T3) is electrically connected to the data writing sub-circuit, a source of the driving transistor (T3) is electrically connected to the data writing sub-circuit, and a drain of the driving transistor (T3) is electrically connected to the light-emitting control sub-circuit, and wherein a first terminal of the storage capacitor is electrically connected to the control electrode of the driving transistor, and a second terminal of the storage capacitor is electrically connected to a first power supply (ELVDD).

12. The pixel driving circuit of claim 8, wherein when the driving current drives the light-emitting element to emit light, the driving current is K(Vdata-ELVDD) 2, where K is a constant related to a driving transistor, Vdata is the data signal, and ELVDD is a first power supply voltage.

13. A pixel driving method applied to a pixel driving circuit configured to drive a light-emitting element to emit light, the pixel driving circuit comprising: a driving sub-circuit connected to the light-emitting element; a data writing sub-circuit electrically connected to a data signal terminal, a scanning signal terminal and the driving sub-circuit, and configured to write a data signal from the data signal terminal into the driving sub-circuit and apply the data signal from the data signal terminal to a leakage current compensation point, under control of a scanning signal from the scanning signal terminal; and a light-emitting control sub-circuit electrically connected to the driving sub-pixel, a light-emitting control signal terminal and the light-emitting element, and configured to control the driving sub-circuit to output a driving current related to the data signal to the light-emitting element under control of a light-emitting control signal from the light-emitting control signal terminal, wherein a voltage of a control electrode of the driving sub-circuit is compensated by a voltage of the leakage current compensation point in a process of emitting light by the light-emitting element, wherein the data writing sub-circuit comprises a first transistor (T8), a second transistor (T4) and a first dual gate transistor (T1-1 T1-2), the scanning signal terminal comprises a first scanning signal terminal (SK) and a third scanning signal terminal (SS), and the leakage current compensation point comprises a first leakage current compensation point (A), wherein a control electrode of the first transistor (T8) is electrically connected to the first scanning signal terminal (SK), a first electrode of the first transistor (T8) is electrically connected to a second electrode of the second transistor (T4), and a second electrode of the first transistor (T8) is electrically connected to an input terminal of the driving sub-circuit, and wherein a control electrode of the second transistor (T4) is electrically connected to the third scanning signal terminal (SS), a first electrode of the second transistor (T4) is electrically connected to the data signal terminal (Vdata), and the second electrode of the second transistor (T4) is electrically connected to the first leakage current compensation point (A) between dual gates of the first dual gate transistor, the pixel driving method comprising:

in a first period, initializing the light-emitting element and the driving sub-circuit by an initialization signal from a predetermined initial voltage terminal, under control of a scanning signal from the scanning signal terminal;

in a second period, writing a data signal from the data signal terminal into the driving sub-circuit, under control of the scanning signal from the scanning signal terminal;

in a third period, applying the data signal from the data signal terminal to a leakage current compensation point, under control of the scanning signal from the scanning signal terminal; and in a fourth period, controlling the driving sub-circuit to output a driving current related to the data signal to the light-emitting element under control of a light-emitting control signal from a light-emitting control signal terminal, wherein in the fourth period, a voltage of a control electrode of the driving sub-circuit is compensated by a voltage of the leakage current compensation point, wherein in the third period, the third scanning signal terminal (SS) is at an effective level, and the second transistor (T4) is turned on, and the data signal from the data signal terminal is applied to the first leakage current compensation point through the second transistor (T4).

14. The method of claim 13, wherein in the first period, the first scanning signal terminal (SK) is at an effective level, and the first transistor (T8) is turned on, and the input terminal of the driving sub-circuit is initialized by the initialization signal through the first transistor (T8).

* * * * *